(12) United States Patent
Noguchi et al.

(10) Patent No.: US 12,409,419 B2
(45) Date of Patent: Sep. 9, 2025

(54) BUBBLE GENERATION DEVICE AND LIQUID FILTRATION DEVICE

(71) Applicant: MEIDENSHA CORPORATION, Tokyo (JP)

(72) Inventors: Hiroshi Noguchi, Singapore (SG); Terutake Niwa, Singapore (SG); Akitoshi Nakagawa, Tokyo (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 18/842,719

(22) PCT Filed: Feb. 28, 2023

(86) PCT No.: PCT/JP2023/007262
§ 371 (c)(1),
(2) Date: Aug. 29, 2024

(87) PCT Pub. No.: WO2023/167173
PCT Pub. Date: Sep. 7, 2023

(65) Prior Publication Data
US 2025/0108335 A1     Apr. 3, 2025

(30) Foreign Application Priority Data
Mar. 2, 2022   (JP) ................. 2022-031598

(51) Int. Cl.
*B01D 65/02*   (2006.01)
*B01D 69/06*   (2006.01)
*C02F 1/44*    (2023.01)

(52) U.S. Cl.
CPC ............ *B01D 65/02* (2013.01); *B01D 69/06* (2013.01); *C02F 1/44* (2013.01); *B01D 2321/185* (2013.01); *C02F 2303/16* (2013.01)

(58) Field of Classification Search
CPC .. B01D 65/02; B01D 69/06; B01D 2321/185; C02F 1/44; C02F 2303/16
See application file for complete search history.

(56) References Cited

U.S. PATENT DOCUMENTS

2017/0056831 A1   3/2017  Tanaka et al.
2017/0120197 A1   5/2017  Tanaka et al.
(Continued)

FOREIGN PATENT DOCUMENTS

JP   S63136728 U   *  9/1988
JP   2018079442 A  *  5/2018
(Continued)

*Primary Examiner* — Patrick Orme
(74) *Attorney, Agent, or Firm* — Foley & Lardner LLP

(57) ABSTRACT

A bubble generation device capable of causing bubbles to hit filtration membranes almost simultaneously includes a housing having side plates and a top plate fixed to the side plates; bubble release ports disposed therein and arranged along a longitudinal direction of the top plate; and a bubble release chamber disposed in the housing and communicated with the bubble release ports. A folded-back path is formed by at least a folded-back plate and an inner plate disposed therein. One end and another end, respectively, of each of the folded-back plate and the inner plate in the longitudinal direction, are fixed to one of the two side plates and another of the two side plates, which face each other. One side and another side, respectively, of the folded-back path in the lateral direction are communicated with the bubble release chamber and a gas storage chamber.

14 Claims, 16 Drawing Sheets

(56) References Cited

U.S. PATENT DOCUMENTS

| | | |
|---|---|---|
| 2023/0321605 A1 | 10/2023 | Noguchi et al. |
| 2023/0321614 A1 | 10/2023 | Noguchi et al. |

FOREIGN PATENT DOCUMENTS

| | | | |
|---|---|---|---|
| JP | 2020065976 A | * | 4/2020 |
| WO | WO-2015/146611 A1 | | 10/2015 |
| WO | WO-2015/146686 A1 | | 10/2015 |
| WO | WO-2022/059478 A1 | | 3/2022 |
| WO | WO-2022/059479 A1 | | 3/2022 |

* cited by examiner

BUBBLE GENERATION DEVICE AND LIQUID FILTRATION DEVICE

TECHNICAL FIELD

The present invention relates to a bubble generation device and a liquid filtration device using the same.

BACKGROUND ART

Conventionally, in a liquid filtration device that filtrates a liquid using a filtration membrane, in order to suppress clogging of the filtration membrane, it is common to remove contamination substances from the surface of the filtration membrane by scrubbing. Scrubbing is a method in which bubbles are released from below a filtration membrane toward the filtration membrane by a bubble generation device, and a liquid near a surface of the filtration membrane is vigorously shaken by the bubbles.

A known bubble generation device includes a gas storage chamber and a folded-back path communicating with an upper portion thereof. The gas storage chamber stores a liquid therein and stores a gas supplied into the liquid above the liquid. The folded-back path communicates with the upper portion of the gas storage chamber and extends to the below, and is then folded back to extend to the above.

As a bubble generation device having such a configuration, a bubble generation device described in Patent Literature 1 is known. The bubble generation device includes a gas storage path as a gas storage chamber and a gas guide path as a folded-back path. The gas storage path and the gas guide path are installed in the liquid. A gas is supplied from the outside into the liquid in a liquid storage path, floats in the liquid, and is stored in the upper portion of the liquid storage path. As the storage amount of the gas in the liquid storage path increases, the gas eventually enters the gas guide path from the upper portion of the liquid storage path. In the gas guide path, the gas moves to the below while pushing down the liquid in the gas guide path, and is directed toward the folded-back portion of the gas guide path. The gas that has reached the folded-back portion of the gas guide path is connected to the gas in the subsequent gas storage chamber, and floats at once while pushing up the liquid existing on the downstream side of the folded-back portion. Then, the gas is released as bubbles from the opening on the outlet side of the gas guide path.

CITATION LIST

Patent Literature

Patent Literature 1: WO 2015/146686 A

SUMMARY OF INVENTION

Technical Problem

In the bubble generation device described in Patent Literature 1, since the opening at the end of the pipe constituting the gas guide path serves as a bubble release port for releasing bubbles as it is, one spherical bubble is intermittently released. In the bubble generation device having such a configuration, in order to bring bubbles into contact with a wide range of the filtration membrane, it is necessary to dispose a plurality of gas guide paths side by side and release the bubbles generated from the gas guide paths toward different portions of the filtration membrane.

On the other hand, scrubbing is a cleaning method in which contamination substances are removed from the surface of the filtration membrane by vibration of the filtration membrane due to contact with bubbles. Therefore, when a plurality of bubbles is released toward different portions of the filtration membrane, it is desirable to apply large vibration by hitting the bubbles against the filtration membrane almost simultaneously.

However, in the bubble generation device described in Patent Literature 1, when a plurality of gas guide paths is arranged and bubbles are released from the gas guide paths, it is difficult to make gas supply speeds to the respective gas guide paths uniform. For this reason, the release cycles of the bubbles emitted from the plurality of gas guide paths cannot be synchronized, and it is difficult to hit the plurality of bubbles against the filtration membrane almost simultaneously.

The present invention has been made in view of the above background, and an object thereof is to provide a bubble generation device capable of hitting a plurality of bubbles against a filtration membrane almost simultaneously, and a liquid filtration device using the same.

Solution to Problem

An aspect of the present invention is a bubble generation device including a gas storage chamber that stores a liquid therein and stores a gas supplied into the liquid above the liquid, and a folded-back path that communicates with the gas storage chamber and extends to below, and is then folded back to extend to above, the bubble generation device releasing the gas passing through the folded-back path as bubbles, the bubble generation device including: a housing that includes a plurality of side plates and a top plate fixed to a plurality of the side plates in an aspect of covering a space surrounded by a plurality of the side plates from above; a plurality of bubble release ports that is disposed in the top plate in an aspect of being arranged along a longitudinal direction of the top plate; and a bubble release chamber that is disposed in the housing and communicates with a plurality of the bubble release ports, wherein each of the gas storage chamber, the folded-back path, and the bubble release chamber is disposed in the housing in an aspect of being arranged in an order of the gas storage chamber, the folded-back path, and the bubble release chamber along a lateral direction of the top plate, the folded-back path is formed by at least a folded-back plate having a cross-sectional shape that extends to below and is then folded back to above, and an inner plate disposed inside the folded-back plate, one end of each of the folded-back plate and the inner plate in the longitudinal direction is fixed to one of the two side plates facing each other along the longitudinal direction among a plurality of the side plates, an other end of each of the folded-back plate and the inner plate in the longitudinal direction is fixed to the other of the two side plates, one side of the folded-back path in the lateral direction communicates with the bubble release chamber, and an other side of the folded-back path in the lateral direction communicates with the gas storage chamber.

Advantageous Effects of Invention

According to the present invention, there is an excellent effect that a plurality of bubbles can hit the filtration membrane almost simultaneously.

DESCRIPTION OF EMBODIMENTS

Figure 1:
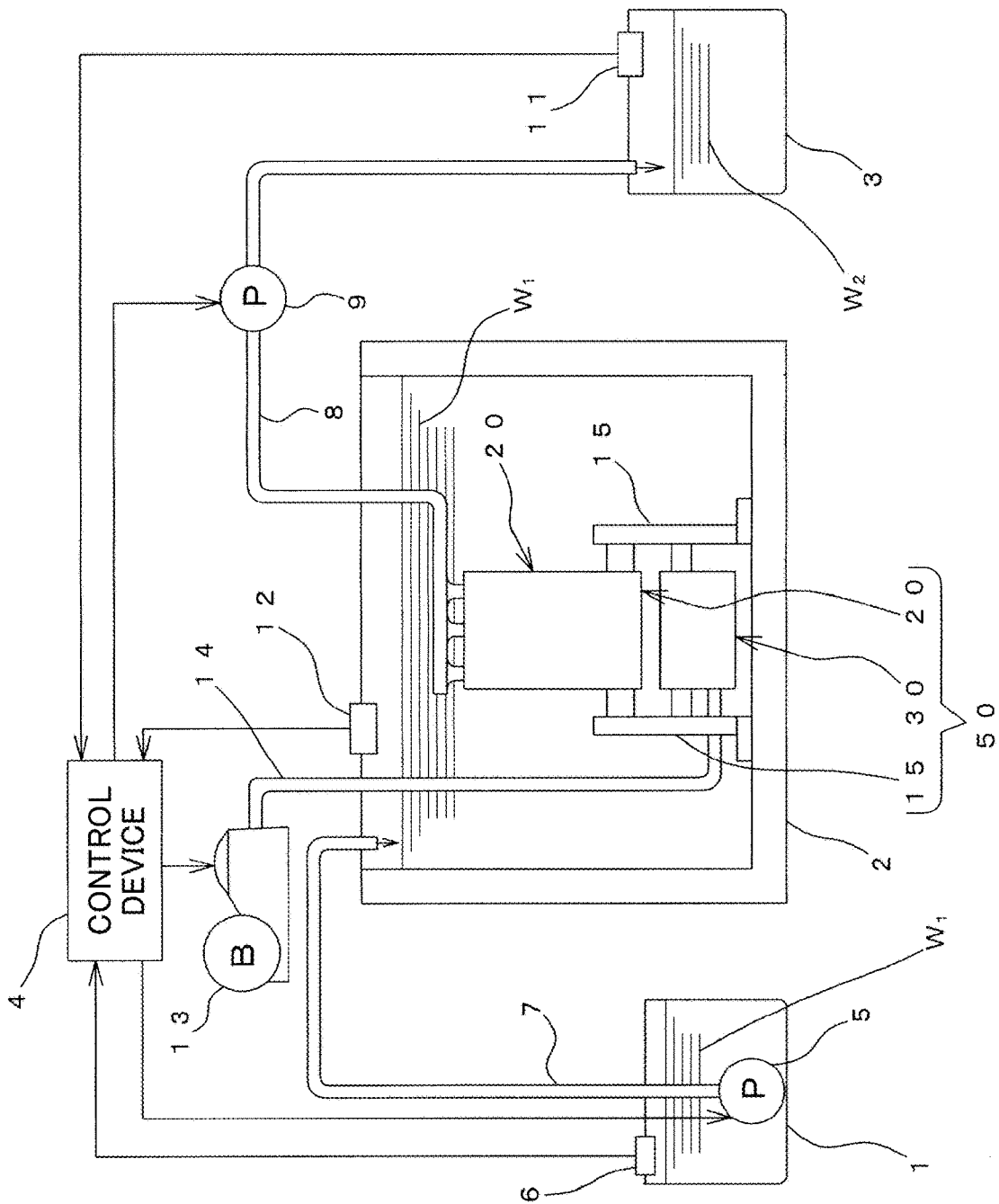
FIG. 1 is a diagram illustrating a schematic configuration of a water treatment facility using a liquid filtration device according to an embodiment.

Hereinafter, an embodiment of a liquid filtration device to which the present invention is applied will be described with reference to the drawings. In the embodiment, for the sake of easy description, structures and elements other than a main part of the present invention will be described in a simplified or omitted manner. In addition, in the drawings, the same elements are denoted by the same reference numerals. Note that the shapes, dimensions, and the like of the elements illustrated in the drawings are schematically illustrated, and do not indicate actual shapes, dimensions, and the like.

FIG. 1 is a diagram illustrating a schematic configuration of a water treatment facility using a liquid filtration device according to an embodiment. The water treatment facility includes a raw water tank 1, a filtration treatment water tank 2, a treatment water tank 3, a control device 4, a raw water pump 5, a first water level sensor 6, a raw water transfer pipe 7, a treatment water transfer pipe 8, a suction pump 9, a second water level sensor 11, a third water level sensor 12, and the like. In addition, the water treatment facility includes a blower 13, an air supply pipe 14, a mount 15, a membrane module 20, a bubble generation device 30, and the like.

In the raw water tank 1, raw water (pre-treatment water) $W_1$ as a liquid is stored. The first water level sensor including an ultrasonic sensor or the like installed in the raw water tank 1 senses the water level (water surface height) of the raw water $W_1$ in the raw water tank 1, and transmits the sensing result to the control device 4 as a water level signal. The raw water pump 5 installed in the raw water tank 1 sucks and discharges the raw water $W_1$ in the raw water tank 1, and sends the raw water $W_1$ to the filtration treatment water tank 2 through the raw water transfer pipe 7. As the raw water pump 5, one including a submersible pump has been exemplified, but one including a land pump may be used.

The filtration treatment water tank 2 is a water tank made of reinforced concrete. A liquid filtration device 50 is installed in the filtration treatment water tank 2. The liquid filtration device 50 includes the mount 15, the membrane module 20, and the bubble generation device 30, and is entirely immersed in the raw water $W_1$ in the filtration treatment water tank 2. The blower 13 discharges the air as the gas sucked from a suction port to the air supply pipe 14 through a discharge port. The air discharged to the air supply pipe 14 is supplied to the bubble generation device 30 of the liquid filtration device 50. The third water level sensor 12 installed in the filtration treatment water tank 2 senses the water level of the raw water $W_1$ in the filtration treatment water tank 2, and transmits the sensing result to the control device 4 as a water level signal.

The suction pump 9 sucks the raw water $W_1$ in the filtration treatment water tank 2 through the treatment water transfer pipe 8 and a membrane element described below installed in the membrane module 20. The sucked raw water $W_1$ is filtrated by the membrane element to become treated water $W_2$, and then sent to the treatment water tank 3 through the treatment water transfer pipe 8. The second water level sensor 11 set on the treatment water tank 3 senses the water level of the treated water $W_2$ in the treatment water tank 3, and transmits the sensing result to the control device 4 as a water level signal.

Note that, instead of the suction pump 9, a pump that generates a suction force using hydraulic head pressure may be used. A means for suction is not particularly limited.

When the water level of the treatment water tank 3 does not reach the upper limit and a predetermined operation execution condition is satisfied, the control device 4 operates the suction pump 9 and the blower 13 to execute the filtration treatment of the raw water $W_1$. However, even when the operation execution condition is satisfied, when the water level of the raw water $W_1$ in the raw water tank 1 is lower than or equal to the lower limit and when the water level of the raw water $W_1$ in the filtration treatment water tank 2 is lower than or equal to the lower limit, the control device 4 stops the execution of the filtration treatment. Note that the role of the blower 13 will be described below.

Figure 2:
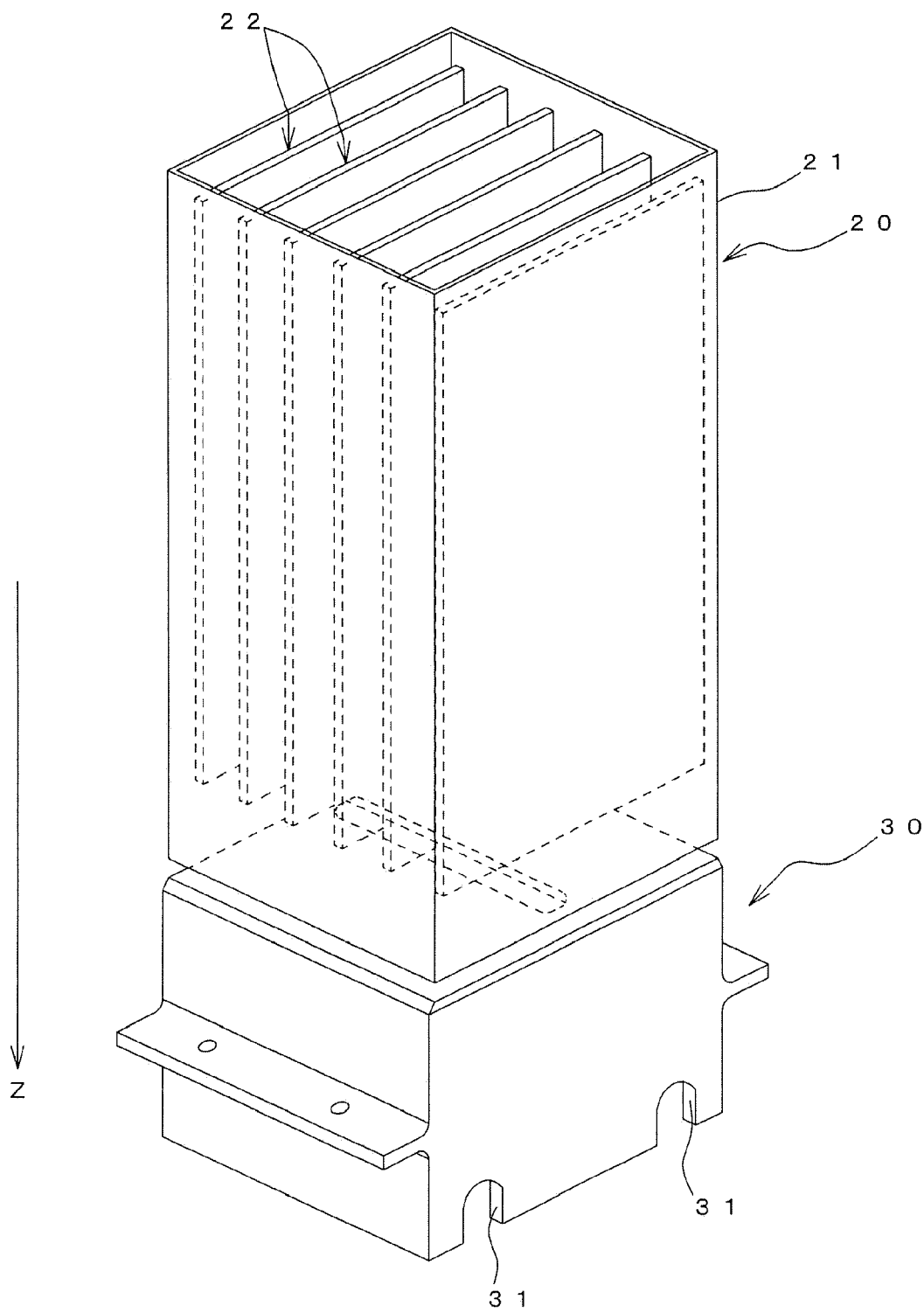
FIG. 2 is a perspective diagram illustrating a membrane module and a bubble generation device of the liquid filtration device.

FIG. 2 is a perspective diagram illustrating the membrane module 20 and the bubble generation device 30 of the liquid filtration device (50) according to the embodiment. In the drawing, Z represents a gravity direction. Hereinafter, the configuration of the liquid filtration device (50) will be described with reference to the drawings, and when the term "up-down direction" is used, the term "up-down direction" means a direction in which the membrane module 20 and the bubble generation device 30 face each other regardless of the orientations of the membrane module 20 and the bubble generation device 30 illustrated in the drawings. In addition, when the term "above" is used, the term "above" means a direction toward the upper side along the "up-down direction" regardless of the orientations of the membrane module 20 and the bubble generation device 30 illustrated in the drawings. In addition, when the term "below" is used, the term "below" means a direction toward the lower side along the "up-down direction" regardless of the orientations of the membrane module 20 and the bubble generation device 30 illustrated in the drawings. In addition, when the term "horizontal direction" is used, the term "horizontal direction" means a direction orthogonal to the "up-down direction" regardless of the orientations of the membrane module 20 and the bubble generation device 30 illustrated in the drawings.

The membrane module 20 includes a housing 21 having a rectangular tube shape and a plurality of membrane elements 22. The plurality of membrane elements 22 has a plate shape, is disposed in an aspect of being arranged in a straight line at intervals along the "horizontal direction" in the housing 21, and is held by the inner surface of the housing 21.

The bubble generation device 30 having a box shape is disposed "below" (immediately below) the membrane module 20. The bubble generation device 30 includes two pipe connection portions 31 on a side plate, and the above-described air supply pipe (14 in FIG. 1) is connected to each of the pipe connection portions 31.

Figure 3:
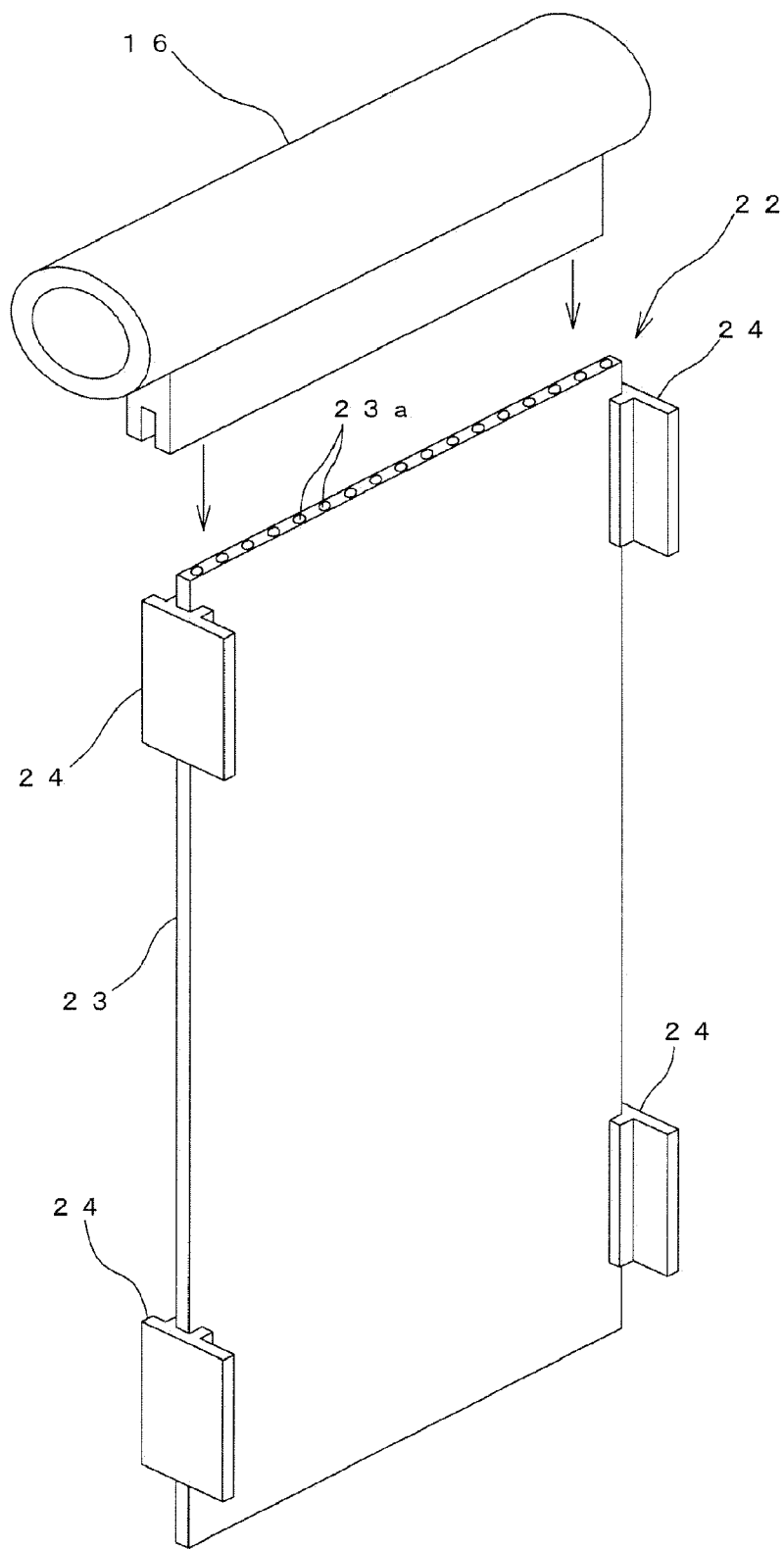
FIG. 3 is a perspective diagram illustrating a membrane element and a socket pipe of the membrane module.

FIG. 3 is a perspective diagram illustrating the membrane element 22 and a socket pipe 16. The membrane element 22 includes a filtration membrane 23 and four holding members 24. In the liquid filtration device (50) according to the embodiment, a filtration membrane made of a flat membrane having a plate shape is used as the filtration membrane 23, but the type of filtration membrane 23 is not limited to the flat membrane, and other types such as a hollow fiber membrane may be used. The material of the filtration membrane 23 may be an organic material such as polyvinyl chloride (PVC) or polyvinylidene fluoride (PVDF), or may be a ceramic composed of one type or a plurality of types of alumina, cordierite, silicon carbide, and other metal oxides. In addition, the filtration membrane 23 may be a composite membrane in which an organic membrane and a ceramic membrane are combined.

The filtration membrane 23 includes a plurality of hollows 23a extending in the up-down direction. These hollows 23a are arranged at predetermined intervals in a lateral direction of the filtration membrane 23, and the upper ends of the hollows 23a are openings facing the "above".

The socket pipe 16 is attached to an upper end portion of the filtration membrane 23. In addition, the above-described treatment water transfer pipe (8 in FIG. 1) is connected to the socket pipe 16. When the suction pump (9 in FIG. 1) is operated, a suction force is generated on the surface of the filtration membrane 23, and the raw water ($W_1$ in FIG. 1) existing around the filtration membrane 23 is sucked into the hollows 23a through the countless fine holes of the filtration membrane 23. At this time, the raw water $W_1$ is filtrated, and the contamination substances in the raw water $W_1$ remain on the surface of the filtration membrane 23.

Each of the four holding members 24 is engaged with an engagement portion provided on the inner surface of the housing (21 in FIG. 2) in a state of being fixed near the corner of the filtration membrane 23.

The bubble generation device 30 installed "below" the membrane module 20 releases the bubbles toward the "above" membrane module 20. The released bubbles float in the raw water $W_1$ and enter the housing 21 through the opening at the lower end of the housing 21 of the membrane module 20. Thereafter, the bubbles reach the lower ends of the plurality of filtration membranes 23, are divided into a plurality of parts by the filtration membranes 23, and then enter a region between the filtration membranes 23 adjacent to each other (hereinafter, referred to as an "inter-membrane region"). The bubbles floating in the "inter-membrane region" vigorously shake the raw water $W_1$ near the surface of the filtration membranes 23 to remove the contamination substances adhering to the surfaces of the filtration membranes 23.

Note that the shape of the housing 21 is a shape surrounding the four sides of the plurality of membrane elements 22 as illustrated in the drawing, but may be a shape having an opening in a part of a side surface of the housing 21 as long as the bubbles do not largely leak from the inside of the housing 21.

Figure 4:
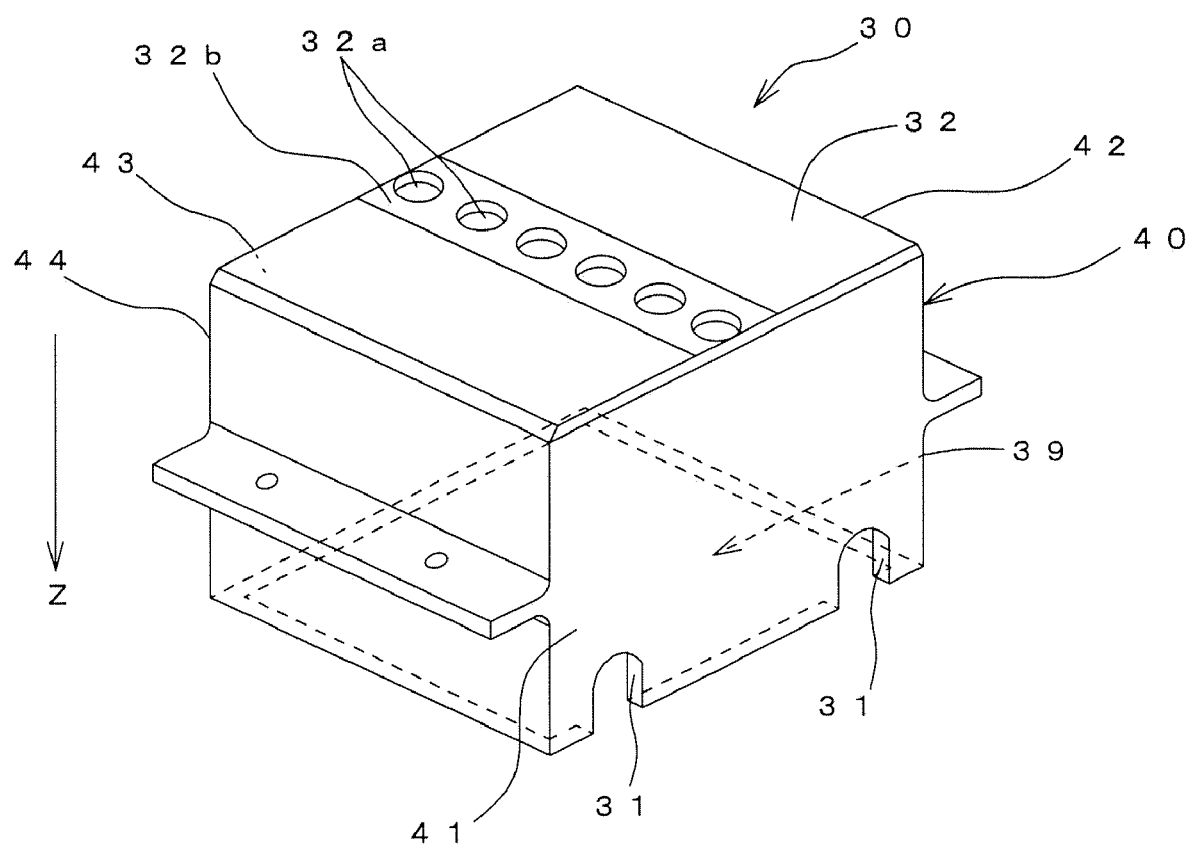
FIG. 4 is a perspective diagram illustrating the bubble generation device of the liquid filtration device.

FIG. 4 is a perspective diagram illustrating the bubble generation device 30. The bubble generation device 30 includes a housing 40. The housing 40 includes a first side plate 41, a second side plate 42, a third side plate 43, a fourth side plate 44, and a top plate 32. The top plate 32 is formed with an elongated hole having a rectangular shape extending along a longitudinal direction of the top plate 32. A cover plate 32b having a rectangular shape is fixed to the top plate 32 so as to cover the elongated hole. The cover plate 32b is a part of the top plate 32. In the cover plate 32b, six bubble release ports 32a having a perfect circular shape are formed in an aspect of being arranged in a straight line. The bubble generation device 30 does not include a bottom plate, and includes a lower end opening 39 that is largely opened to the "below" at a lower end of the bubble generation device 30.

Figure 5:
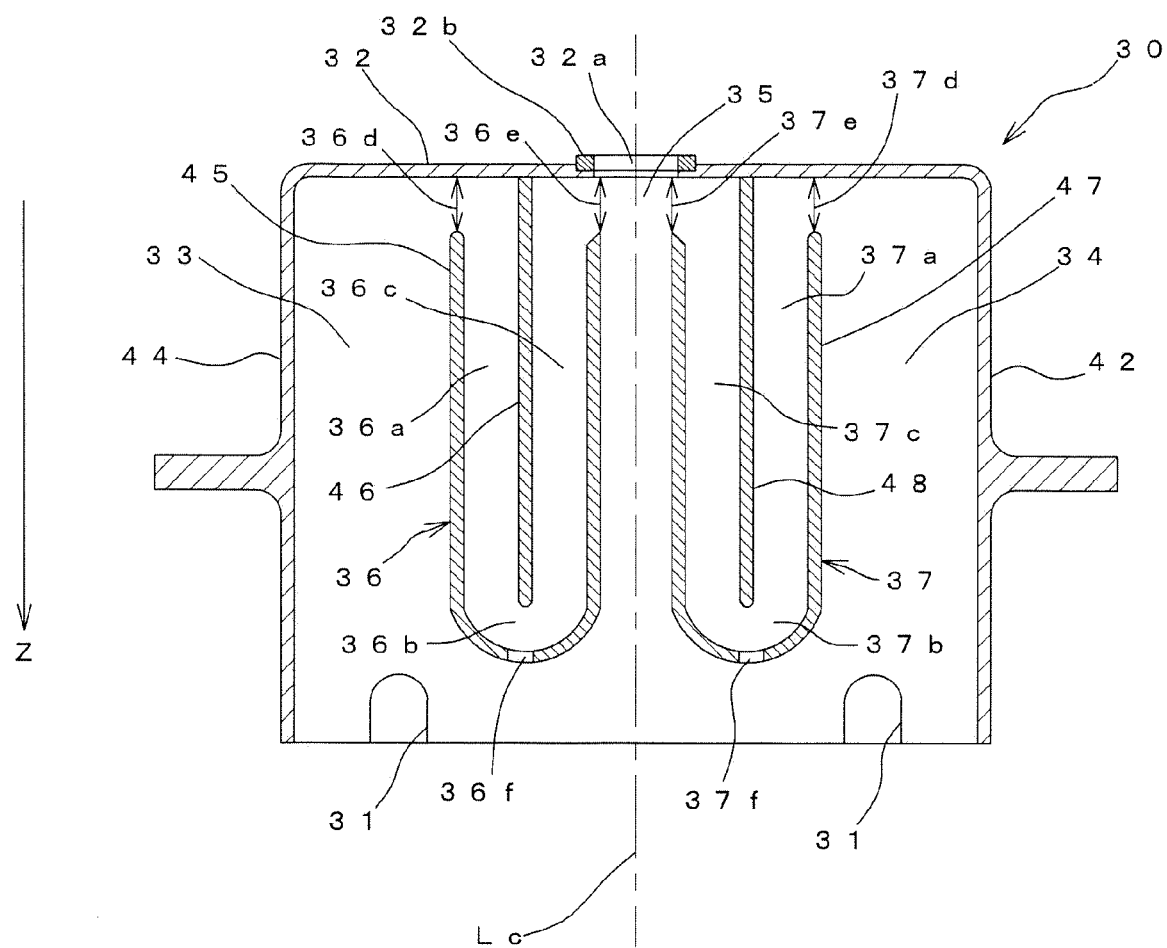
FIG. 5 is a cross-sectional diagram of the bubble generation device.
Figure 6:
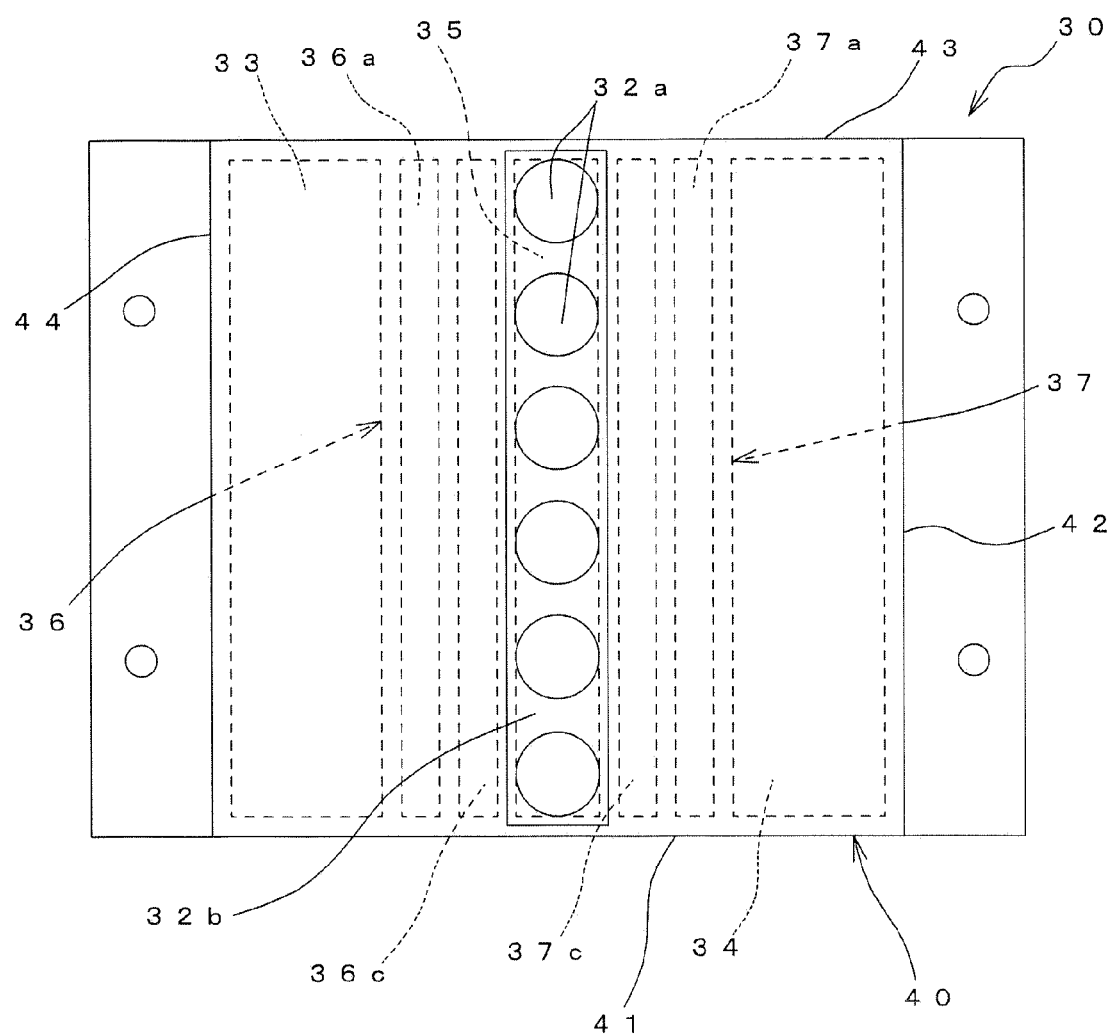
FIG. 6 is a plan diagram of the bubble generation device.

FIG. 5 is a cross-sectional diagram of the bubble generation device 30. In addition, FIG. 6 is a plan diagram of the bubble generation device 30. The bubble generation device 30 includes a first gas storage chamber 33, a second gas storage chamber 34, a bubble release chamber 35, a first folded-back path 36, a second folded-back path 37, and the like. Each of the first gas storage chamber 33, the second gas storage chamber 34, the bubble release chamber 35, the first folded-back path 36, and the second folded-back path is disposed in the housing 40.

The dashed-dotted line in FIG. 5 is a center line Lc of the top plate 32. Each of the six bubble release ports 32a that releases the bubbles including air as a gas is disposed in an aspect that the center thereof is positioned on the center line Lc of the top plate 32 and is opened to the "above". The bubble release chamber 35 is disposed "below" (immediately below) the six bubble release ports 32a, and communicates with each of the six bubble release ports 32a.

As illustrated in FIG. 6, the shape of the bubble release chamber 35 is an elongated shape extending along the arrangement direction of the six bubble release ports 32a.

Each of the first gas storage chamber 33 and the second gas storage chamber 34 stores the raw water (treatment target water) as a liquid therein, and stores air as a gas supplied into the raw water "above" the raw water. The first folded-back path 36 communicates with the first gas storage chamber 33 and extends to the "below", and is then folded back to extend to the "above". The second folded-back path 37 communicates with the second gas storage chamber 34 and extends to the "below", and is then folded back to extend to the "above".

A left-right direction in FIG. 5 is along the lateral direction of the top plate 32. In addition, a direction orthogonal to the paper surface of FIG. 5 is along the longitudinal direction of the top plate 32. Each of the first gas storage chamber 33, the first folded-back path 36, the bubble release chamber 35, the second folded-back path 37, and the second gas storage chamber 34 is disposed in an aspect of being arranged in an order of the first gas storage chamber 33, the first folded-back path 36, the bubble release chamber 35, the second folded-back path 37, and the second gas storage chamber 34 in the lateral direction of the top plate 32.

The first folded-back path 36 is formed by at least a folded-back plate 45 having a cross-sectional shape (more specifically, a U-shaped cross-sectional shape) that extends to the "below" and is then folded back to the "above", and an inner plate 46 disposed inside the folded-back plate 45. One end of each of the folded-back plate 45 and the inner plate 46 in the longitudinal direction (the same as the longitudinal direction of the top plate 32) is fixed to the first side plate 41 as one of the first side plate 41 and the third side plate 43 facing each other along the longitudinal direction among the four side plates (41 to 44). The other end of each of the folded-back plate 45 and the inner plate 46 in the longitudinal direction is fixed to the third side plate 43, which is the other side plate. One side of the first folded-back path 36 in the lateral direction communicates with the bubble release chamber 35. The other side of the first folded-back path 36 in the lateral direction communicates with the first gas storage chamber 33.

The folded-back plate 45 of the first folded-back path 36 is fixed to the first side plate 41 and the third side plate 43 in an aspect in which a gap is formed between the top plate 32 and an upper end on one side in the lateral direction while a gap is formed between the top plate 32 and an upper end on the other side in the lateral direction. The first folded-back path 36 and the bubble release chamber 35 communicate with each other through a second communication port 36e formed of the gap between the upper end on the one side in the lateral direction of the folded-back plate 45 of the first folded-back path 36 and the top plate 32. In addition, the first folded-back path 36 and the first gas storage chamber 33 communicate with each other through a first communication port 36d, which is the gap between the upper end on the other side in the lateral direction of the folded-back plate 45 of the first folded-back path 36 and the top plate 32. The inner plate 46 of the first folded-back path 36 is fixed to the first side plate 41, the second side plate 42, and the top plate 32.

The second folded-back path 37 is formed by at least a folded-back plate 47 having a cross-sectional shape (more specifically, a U-shaped cross-sectional shape) that extends to the "below" and is then folded back to the "above", and an inner plate 48 disposed inside the folded-back plate 47. One end of each of the folded-back plate 47 and the inner plate 48 of the second folded-back path 37 in the longitudinal direction is fixed to the first side plate 41. In addition, the other end of each of the folded-back plate 47 and the inner plate 48 of the second folded-back path 37 in the longitudinal direction is fixed to the third side plate 43. The other side of the second folded-back path 37 in the lateral direction communicates with the bubble release chamber 35. In addition, one side of the second folded-back path 37 in the lateral direction communicates with the second gas storage chamber 34.

The folded-back plate 47 of the second folded-back path 37 is fixed to the first side plate 41 and the third side plate 43 in an aspect in which a gap is formed between the top plate 32 and an upper end on one side in the lateral direction while a gap is formed between the top plate 32 and an upper end on the other side in the lateral direction. The second folded-back path 37 and the bubble release chamber 35 communicate with each other through a first communication port 37e, which is a gap between the upper end on the other side in the lateral direction of the folded-back plate 47 of the second folded-back path 37 and the top plate 32. In addition, the second folded-back path 37 and the second gas storage chamber 34 communicate with each other through a second communication port 37d, which is a gap between the upper end on the one side in the lateral direction of the folded-back plate 47 of the second folded-back path 37 and the top plate 32. The inner plate 48 of the second folded-back path 37 is fixed to the first side plate 41, the third side plate 43, and the top plate 32.

The structure of the second folded-back path 37 is a structure that is line-symmetric with respect to the center line Lc with respect to the first folded-back path 36. The first gas storage chamber 33 is adjacent to the first folded-back path 36 on the other side in the lateral direction. In addition, the second gas storage chamber 34 is adjacent to the second folded-back path 37 on the one side in the lateral direction. The structure of the second gas storage chamber 34 is a structure that is line-symmetric with respect to the center line Lc with respect to the first gas storage chamber 33.

The first folded-back path 36 includes a descending portion 36a extending from the first communication port 36d toward the "below", a folded-back portion 36b folded back toward the "above", and an ascending portion 36c extending toward the "above" and communicating with the second communication port 36e. The second folded-back path 37 also includes a similar descending portion 37a, a similar folded-back portion 37b, and a similar ascending portion 37c.

In the bubble generation device 30 having such a configuration, as the air storage amount in the first gas storage chamber 33 increases, the air in the descending portion 36a of the first folded-back path 36 gradually descends in the descending portion 36a. When the air storage amount in the first gas storage chamber 33 further increases, the air in the descending portion 36a reaches the folded-back portion 36b, ascends at once in the ascending portion 36c, and enters the bubble release chamber 35. In addition, as the air storage amount in the second gas storage chamber 34 increases, the air in the descending portion 37a of the second folded-back path 37 gradually descends in the descending portion 37a. When the air storage amount in the second gas storage chamber 34 further increases, the air in the descending portion 37a reaches the folded-back portion 37b, ascends at once in the ascending portion 37c, and enters the bubble release chamber 35.

The air that has ascended in the ascending portion 36c of the first folded-back path 36 and the air that has ascended in the ascending portion 37c of the second folded-back path 37 merge in the bubble release chamber 35, and are then released from the six bubble release ports 32a. Since substantially uniform pressure is applied to the air in the bubble release chamber 35 in the "horizontal direction" by the raw water existing "below", the bubbles are released from each of the six bubble release ports 32a almost simultaneously. Thus, with the bubble generation device 30, the plurality of bubbles can be caused to hit the filtration membranes 23 almost simultaneously.

Figure 7:
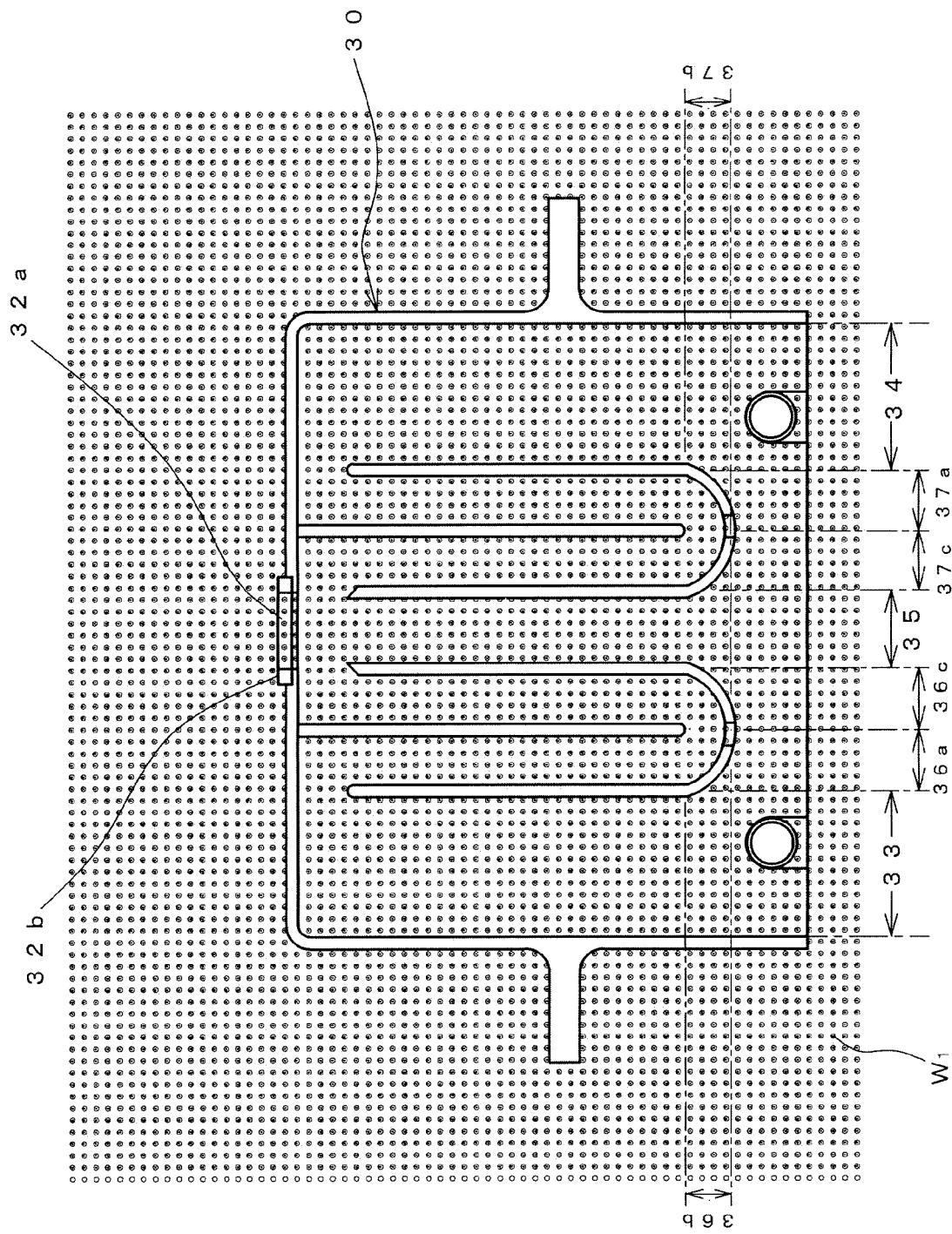
FIG. 7 is a cross-sectional diagram illustrating the bubble generation device in a non-operating state.

FIG. 7 is a cross-sectional diagram illustrating the bubble generation device 30 in a non-operating state. In the drawing, hatching in the cross section of the bubble generation device 30 is omitted for easy viewing. In the bubble generation device 30 in a non-operating state, as illustrated in the drawing, most of the internal space of the bubble generation device 30 is filled with the raw water $W_1$.

The bubble generation device 30 can intermittently form bubbles from the bubble release ports 32a. Hereinafter, a process from when the bubbles are released from the bubble release ports 32a to immediately before the bubbles are released from the bubble release ports 32a is referred to as batch treatment.

Figure 8:
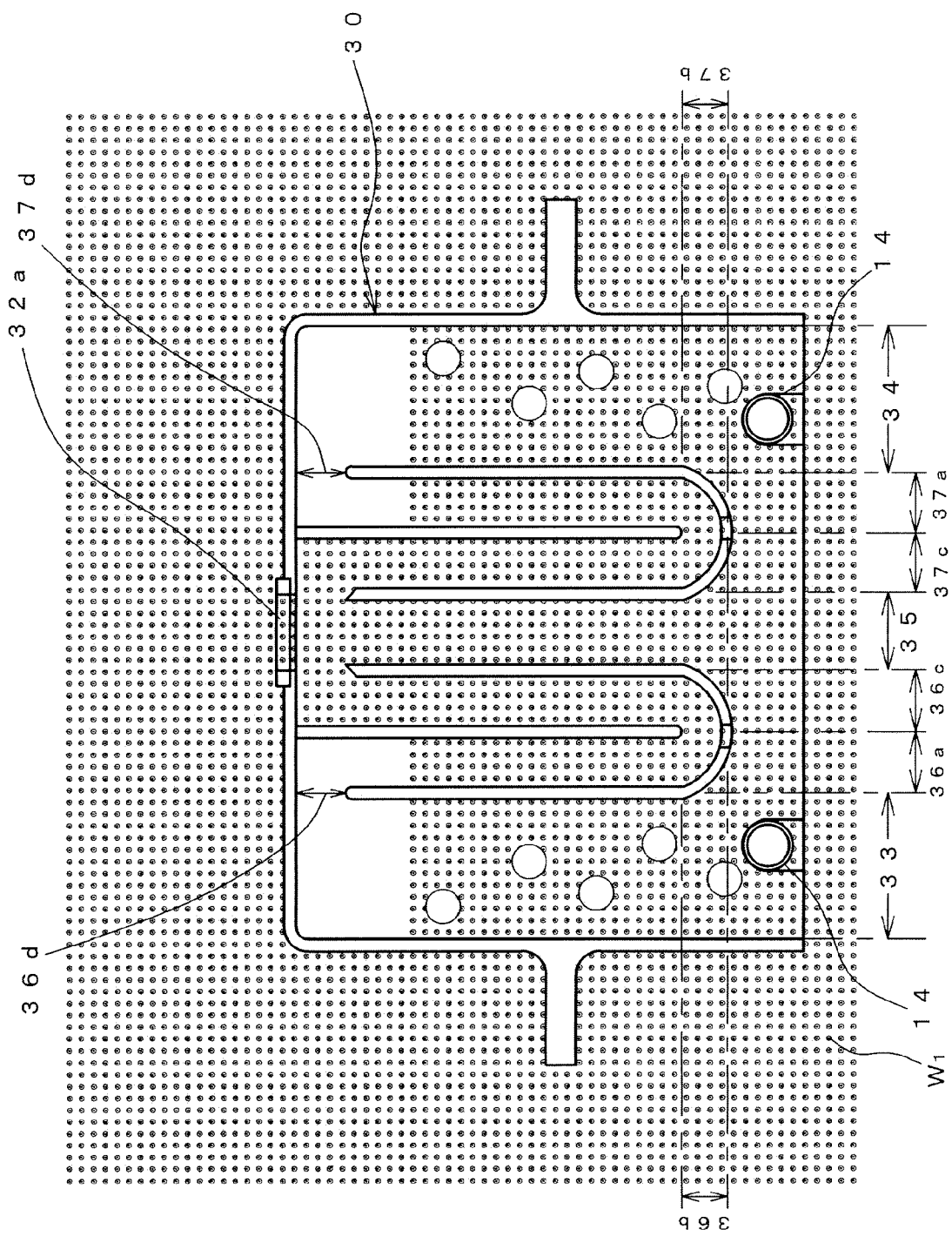
FIG. 8 is a cross-sectional diagram illustrating the bubble generation device in a state of a first phase in batch treatment.

FIG. 8 is a cross-sectional diagram illustrating the bubble generation device 30 in a state of a first phase in batch treatment. One of the two air supply pipes 14 connected to the bubble generation device 30 is opened at a lower portion of the first gas storage chamber 33 and supplies air to the raw water $W_1$ in the first gas storage chamber 33. In addition, the other is opened at a lower portion of the second gas storage chamber 34 and supplies air to the raw water $W_1$ in the second gas storage chamber 34.

In the first phase of the batch treatment, the air supplied into the raw water $W_1$ by one of the two air supply pipes 14 floats in the raw water $W_1$ and is stored in the upper portion of the first gas storage chamber 33. A part of the air stored in the upper portion of the first gas storage chamber 33 in this manner enters the descending portion 36a of the first folded-back path 36 through the first communication port 36d. In the first gas storage chamber 33 and the descending portion 36a of the first folded-back path 36, the water level of the raw water $W_1$ is lowered as the storage amount of air is increased. The water level of the raw water $W_1$ in the first gas storage chamber 33 is substantially the same as the water level of the raw water W in the first folded-back path 36.

In the first gas storage chamber 33, the amount of the raw water $W_1$ corresponding to the lowering of the water level of the raw water $W_1$ flows out to the outside of the bubble generation device 30 through the lower end opening (39 in FIG. 4) of the bubble generation device 30. In addition, in the descending portion 36a of the first folded-back path 36, the amount of the raw water $W_1$ corresponding to the lowering of the water level of the raw water $W_1$ enters the folded-back portion 36b. As a result of this entry, substantially the same amount of the raw water $W_1$ ascends in the ascending portion 36c of the first folded-back path 36, and enters the bubble release chamber 35 through the second communication port (36e in FIG. 5). As a result of this entry, substantially the same amount of the raw water $W_1$ flows out to the outside of the bubble generation device 30 through the lower end opening or the bubble release ports 32a of the bubble generation device 30.

Although the behavior of the air and the raw water $W_1$ in the first gas storage chamber 33 and the first folded-back path 36 has been described, the same applies to the behavior of the air and the raw water $W_1$ in the second gas storage chamber 34 and the second folded-back path 37.

Figure 9:
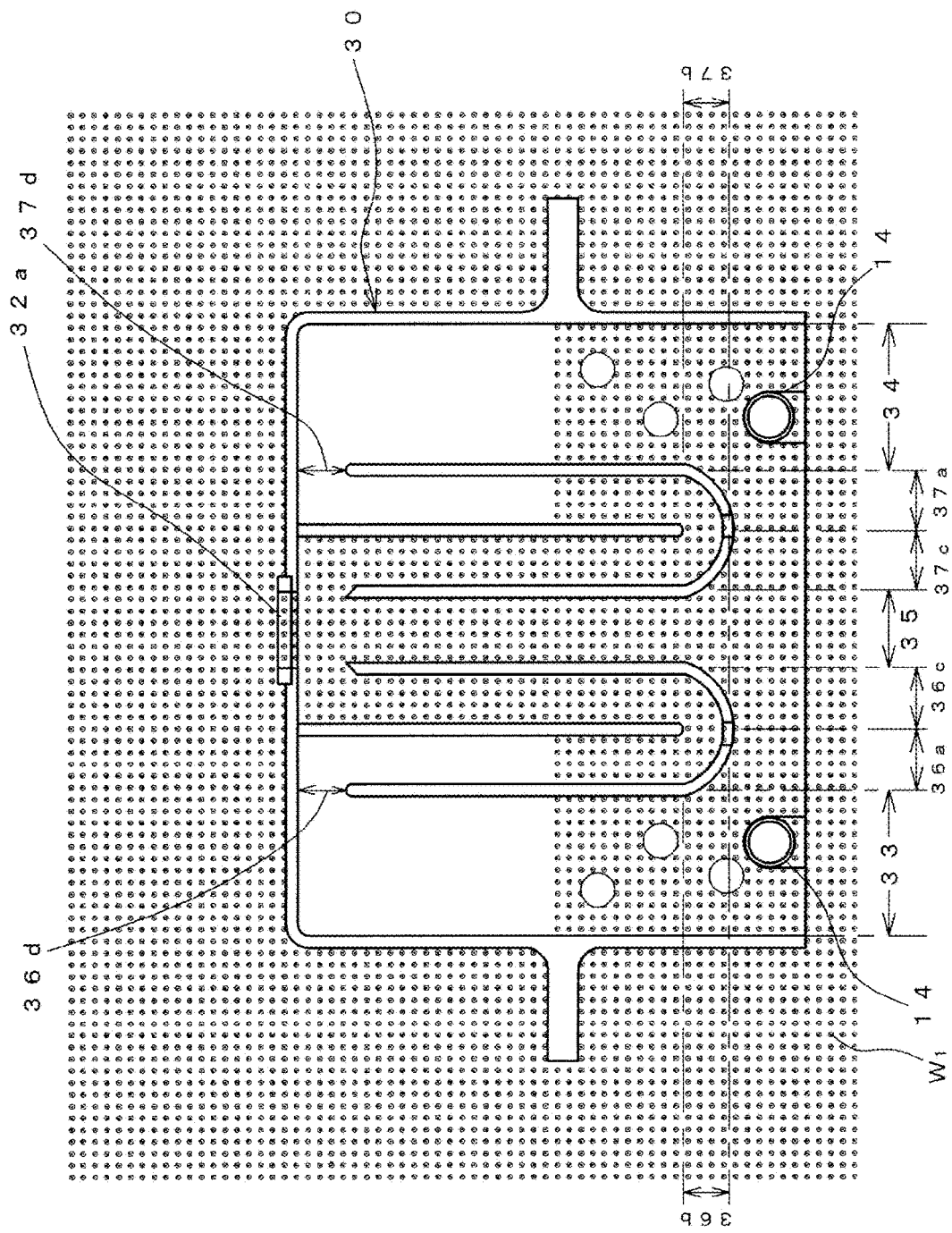
FIG. 9 is a cross-sectional diagram illustrating the bubble generation device in a state of a second phase in batch treatment.

FIG. 9 is a cross-sectional diagram illustrating the bubble generation device 30 in a state of a second phase in batch treatment. In the second phase of the batch treatment, as compared with the first phase, the storage amount of air in each of the first gas storage chamber 33, the descending portion 36a of the first folded-back path 36, the second gas storage chamber 34, and the descending portion 37a of the second folded-back path 37 is increased and the water level of the raw water $W_1$ is lowered.

Immediately before the end of the second phase of the batch treatment, in the first folded-back path 36, the air in the descending portion 36a enters the folded-back portion 36b and passes through the folded-back point of the folded-back portion 36b.

Figure 10:
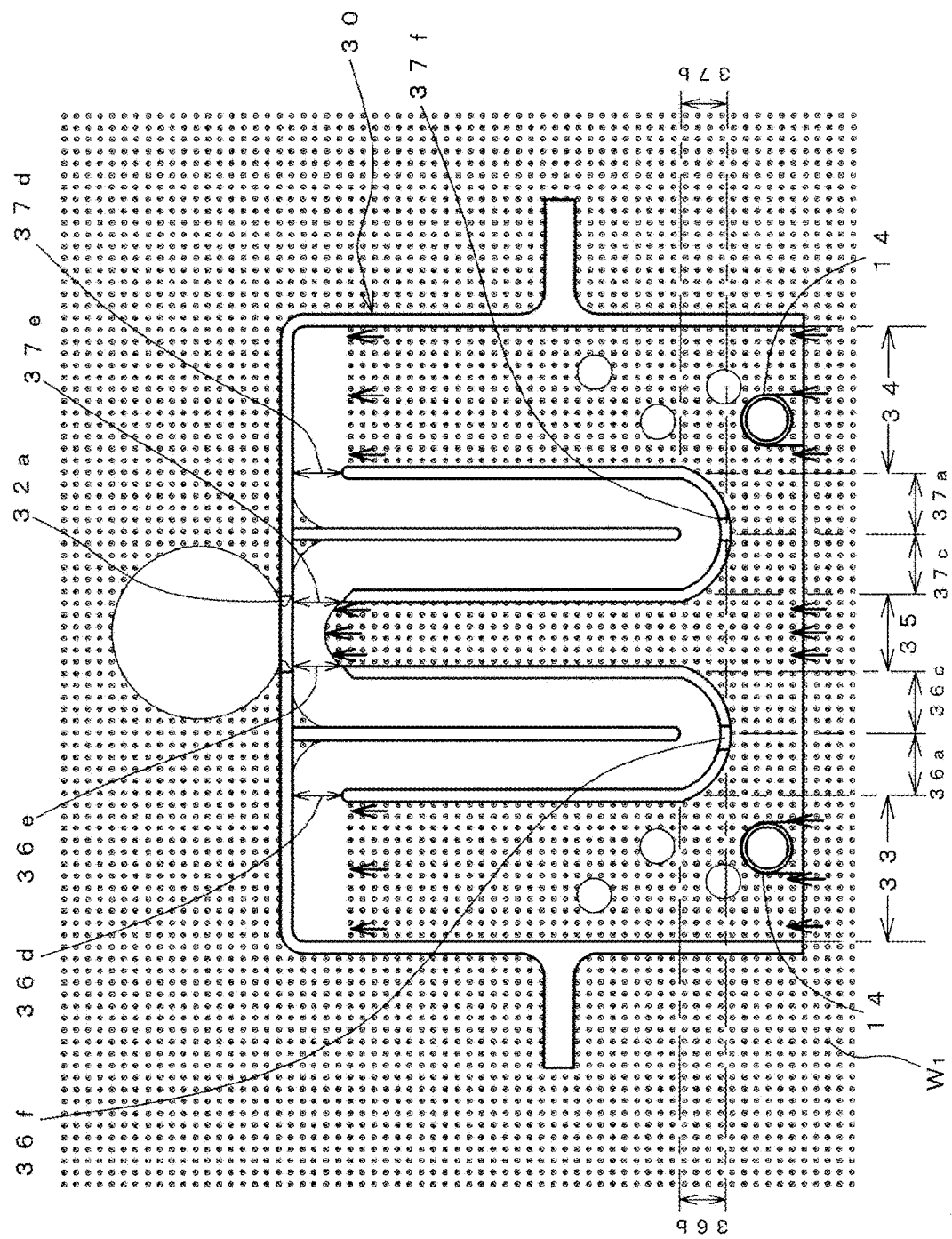
FIG. 10 is a cross-sectional diagram illustrating the bubble generation device in a state of a third phase in batch treatment.
Figure 11:
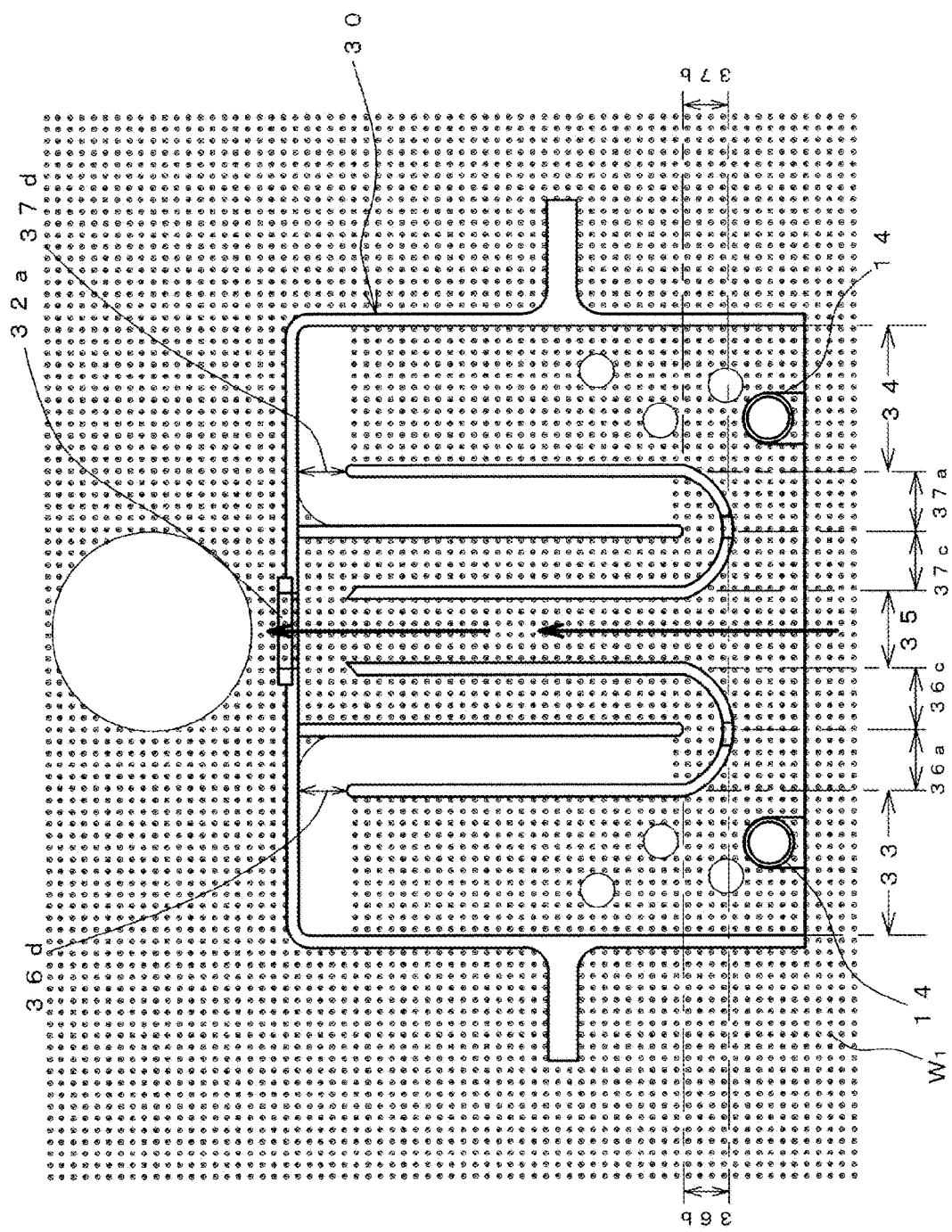
FIG. 11 is a cross-sectional diagram illustrating the bubble generation device in a state of a fourth phase in batch treatment.

FIG. 10 is a cross-sectional diagram illustrating the bubble generation device 30 in a state of a third phase in batch treatment. In the third phase, the air that has passed through the folded-back point ascends at a high speed in the ascending portion 36c of the first folded-back path 36 and reaches the second communication port 36e, and further exits to the outside of the bubble generation device 30 through the bubble release chamber 35 and the bubble release ports 32a. In synchronization with such a behavior of air, the air in the first gas storage chamber 33 enters the descending portion 36a of the first folded-back path 36 through the first communication port 36d and descends at a high speed in the descending portion 36a.

Although the behavior of the air in the first gas storage chamber 33 and the first folded-back path 36 has been described, the same applies to the behavior of the air in the second gas storage chamber 34 and the second folded-back path 37. Above the bubble release ports 32a, air exiting from the first folded-back path 36 to the outside via the bubble release chamber 35 and air exiting from the second folded-back path 37 to the outside via the bubble release chamber 35 are integrated to form an air aggregate having a circular cross section.

The reason why the large air aggregate as described above is formed above the bubble release ports 32a is as described below.

That is, it is assumed that the flow of the ascending air toward the bubble release ports 32a in the bubble release chamber 35 is faster than the flow of the air entering the bubble release chamber 35 from the ascending portions (36c, 37c) through the second communication ports (36e, 37e). In this case, the moving speed of the air in the bubble release chamber 35 is faster than the moving speed of the air flowing into the bubble release chamber 35 from the second communication ports (36e, 37e). Then, a negative pressure is generated in the bubble release chamber 35. With this negative pressure, the raw water $W_1$ in the bubble release chamber 35 is drawn into the air, and a gas-liquid mixed flow of the air and the raw water $W_1$ is generated. As a result, the air that has entered the bubble release chamber 35 from the folded-back paths (36, 37) through the second communication ports (36e, 37e) is divided by the gas-liquid mixed flow, and does not grow into large bubbles.

One of the causes of the moving speed of the air in the bubble release chamber 35 being faster than the moving speed of the air flowing into the bubble release chamber 35 from the second communication ports (36e, 37e) is the flow path resistance of the folded-back portions (36b, 37b).

Therefore, the bubble generation device 30 according to the embodiment includes the lower end opening (39 in FIG. 4) as an opening facing the "below" at the lower end of each of the two gas storage chambers (33, 34) and the bubble release chamber 35. Since the two gas storage chambers (33, 34) and the bubble release chamber 35 communicate with each other at lower portions, the lower end opening (39 in FIG. 4) functions as a common opening of the two gas storage chambers (33, 34) and the bubble release chamber 35. Strictly speaking, a region immediately below the first gas storage chamber 33 within the entire region of the lower end opening (39 in FIG. 4) is an opening facing "below" at the lower end of the first gas storage chamber 33, and a region immediately below the second gas storage chamber 34 is an opening facing "below" at the lower end of the second gas storage chamber 34. In addition, a region immediately below the bubble release chamber 35 is an opening facing "below" at the lower end of the bubble release chamber 35.

When the air in the bubble release chamber 35 starts to be released to the outside through the bubble release ports 32a, the air existing in the vicinity of the folded-back portions (36b, 37b) starts to move at a speed slightly slower than the preceding air due to the flow path resistance. Then, although a slight negative pressure is generated in the bubble release chamber 35, as indicated by the thick arrows in FIG. 10, the raw water $W_1$ existing "below" the air applies a force directed to the "above" to the air existing "above". At this time, immediately below the bubble release chamber 35, the raw water $W_1$ existing "below" the bubble generation device 30 is caused to enter the inside of the bubble generation device 30 through the lower end opening (39 in FIG. 4), thereby supporting the above-described force. At the same time, in each of the two gas storage chambers (33, 34), the raw water $W_1$ existing "below" the air applies a force of pushing into the folded-back paths (36, 37) through the first communication ports (36d, 37d) to the air existing "above". At this time, immediately below each of the two gas storage chambers (33, 34), the raw water $W_1$ existing "below" the bubble generation device 30 is caused to enter the inside of the bubble generation device 30 through the lower end opening (39 in FIG. 4), thereby supporting the above-described force.

As a result, the air in each of the two folded-back paths (36, 37) smoothly follows the preceding air in the bubble release chamber 35, and quickly flows into the bubble release chamber 35 through the second communication ports (36e, 37e). Therefore, with the bubble generation device 30 according to the embodiment, the succeeding air can be smoothly moved toward the bubble release ports 32a in a state of being continuous with the preceding air without being divided from the preceding air, and can be released from the bubble release ports 32a as bubbles having a large diameter.

As described above, the opening provided at the lower end of the bubble release chamber 35 is a region immediately below the bubble release chamber 35 within the entire region of the lower end opening (39 in FIG. 4). That is, the opening area of the opening provided at the lower end of the bubble release chamber 35 is the same as the cross-sectional area of the bubble release chamber 35 in the horizontal direction. In such a configuration, in the bubble release chamber 35, when bubbles are released, the force for pushing the above air to the above by the raw water $W_1$ existing below the air can be made uniform without being concentrated on a part in the cross-sectional direction. Thus, it is possible to more reliably suppress drawing of the raw water $W_1$ existing in the vicinity of the interface with the air by the air and to more reliably increase the diameter of the bubbles.

The opening provided at the lower end of the gas storage chambers (33, 34) is a region immediately below the gas storage chambers (33, 34) within the entire region of the lower end opening (39 in FIG. 4). That is, the opening area of the opening provided at the lower end of the gas storage chambers (33, 34) is the same as the cross-sectional area of the gas storage chambers (33, 34). In such a configuration, when the bubbles are released from the bubble release ports 32a, in the gas storage chambers (33, 34), the force for pushing the above air to the "above" by the raw water $W_1$ existing below the air can be made uniform without being concentrated on a part in the cross-sectional direction. Thus, it is possible to suppress the inflow of the raw water $W_1$ from the gas storage chambers (33, 34) to the folded-back paths (36, 37) by suppressing the drawing of the raw water $W_1$ existing in the vicinity of the interface with the air by the air.

Note that the shape of the bubble release ports 32a is not limited to a circular shape, and may be another shape such as a rectangular shape. In addition, in the illustrated bubble generation device 30, the cover plate 32b including the six bubble release ports 32a is fixed to the top plate 32, but a plurality of bubble release ports may be provided in the top plate 32 itself. However, in the configuration in which the cover plate 32b is fixed to the top plate 32, the diameter and the disposition interval of the bubble release ports 32a can be easily adjusted by replacing the cover plate 32b.

The bubble generation device 30 according to the embodiment includes the two gas storage chambers (33, 34), but the number of gas storage chambers is not limited to two, and may be one or three or more.

As illustrated in FIG. 4, the bubble release ports 32a are opened to the "above". In such a configuration, as compared with a configuration including a bubble release port that is opened in a direction different from the "above", a phenomenon that the "external preceding air" is cut from the "internal succeeding air" by the peripheral wall of the bubble release port is less likely to occur, and thus bubbles having a larger diameter can be formed.

Note that, in the liquid filtration device (50) according to the embodiment, the bubbles released from the six bubble release ports 32a and having mutually equal sizes become one long continuous large bubble, and then the bubble is divided by the plurality of filtration membranes (23) and enter the "inter-membrane region".

The present inventors experimentally manufactured a test device having the same configuration as the liquid filtration device (50) according to the embodiment, and conducted an experiment of measuring the vibration amount of the filtration membrane (23 in FIG. 3) by scrubbing using bubbles. The fact that the measured value of the vibration amount of the filtration membrane is large suggests that the shake amount of the raw water $W_1$ in the vicinity of the membrane surface is large and the shear force by scrubbing is high. Therefore, the shearing force of the membrane surface can be indirectly evaluated by measuring the vibration amount.

Next, an example in which a more characteristic configuration is added to the bubble generation device (20) according to the embodiment will be described. Note that the configuration of the bubble generation device (20) according to the example is the same as that of the embodiment unless otherwise noted.

In the bubble generation device 30 according to the embodiment illustrated in FIG. 8, it is assumed that there is a difference in air supply speed between one and the other of the two air supply pipes 14. This may cause a defect described below. That is, in one of the folded-back portion 36b of the first folded-back path 36 and the folded-back portion 37b of the second folded-back path 37, the air inside reaches the folded-back point earlier than that in the other, and the bubble having a small diameter only by the supply of the air is released from the bubble release ports 32a. Thereafter, the air inside the other reaches the folded-back point, and the bubble having a small diameter only by the supply of the air is released from the bubble release ports 32a. Thus, the bubble having a small diameter is released from bubble release ports 32a in a cycle shorter than the cycle in the case of releasing the bubble having a large diameter, which may cause cleaning failure of the surface of the filtration membrane (23).

Figure 12:
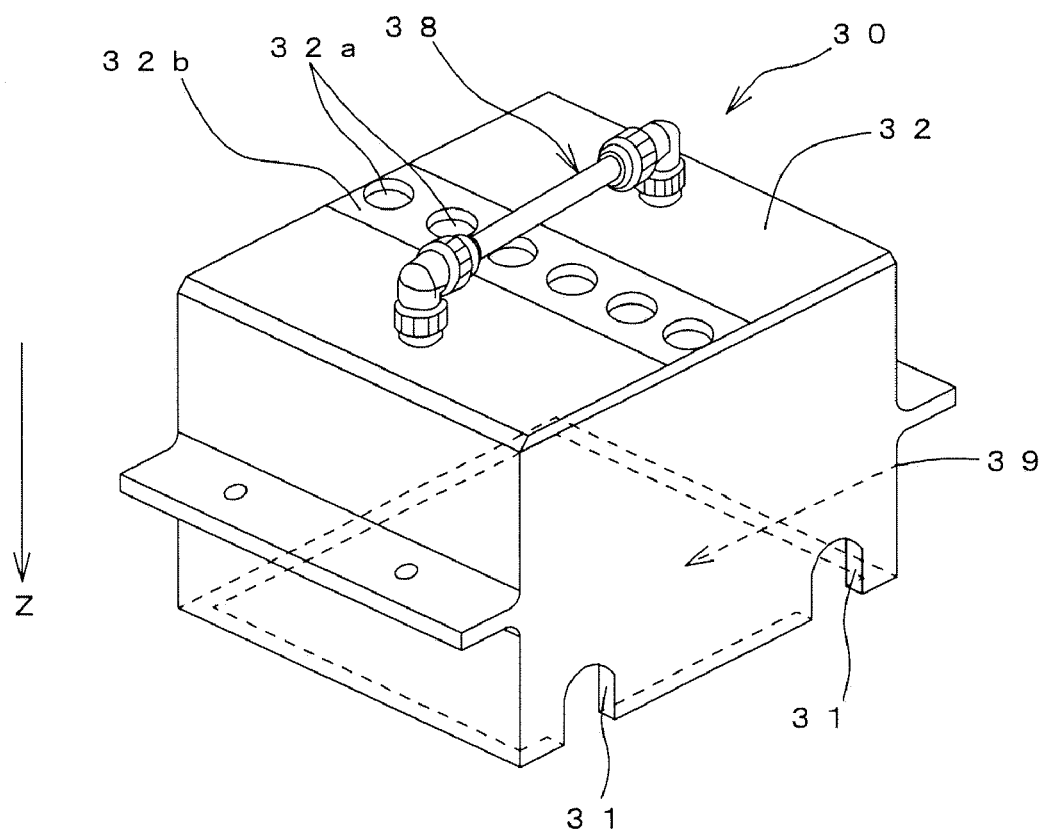
FIG. 12 is a perspective diagram illustrating the bubble generation device according to an example.
Figure 13:
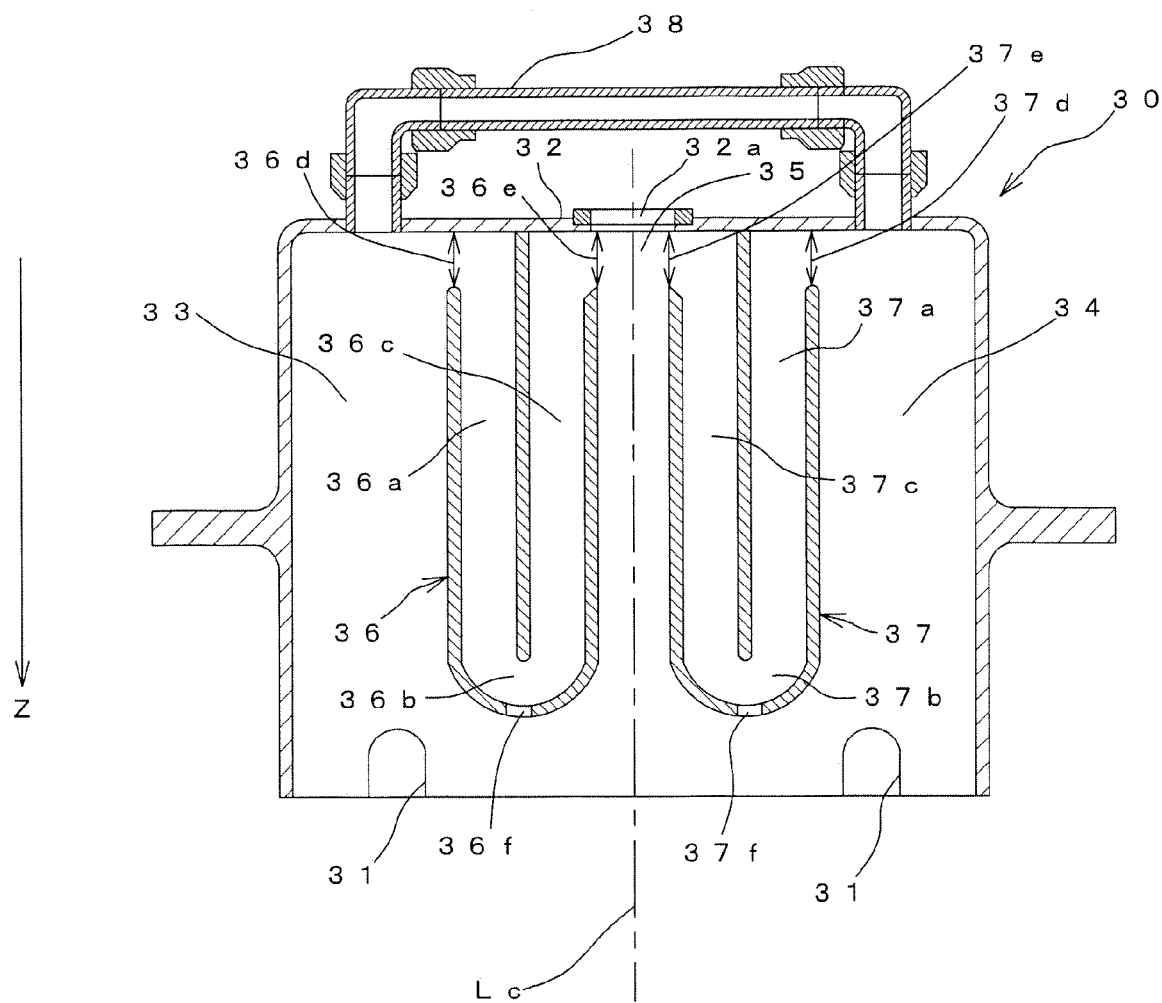
FIG. 13 is a cross-sectional diagram illustrating the bubble generation device.

FIG. 12 is a perspective diagram illustrating the bubble generation device 30 according to an example. In addition, FIG. 13 is a cross-sectional diagram illustrating the bubble generation device 30 according to an example. The bubble generation device 30 according to the example includes a communication pipe 38 that communicates the upper portion (more specifically, the top end) of the first gas storage chamber 33 and the upper portion (more specifically, the top end) of the second gas storage chamber 34.

Figure 14:
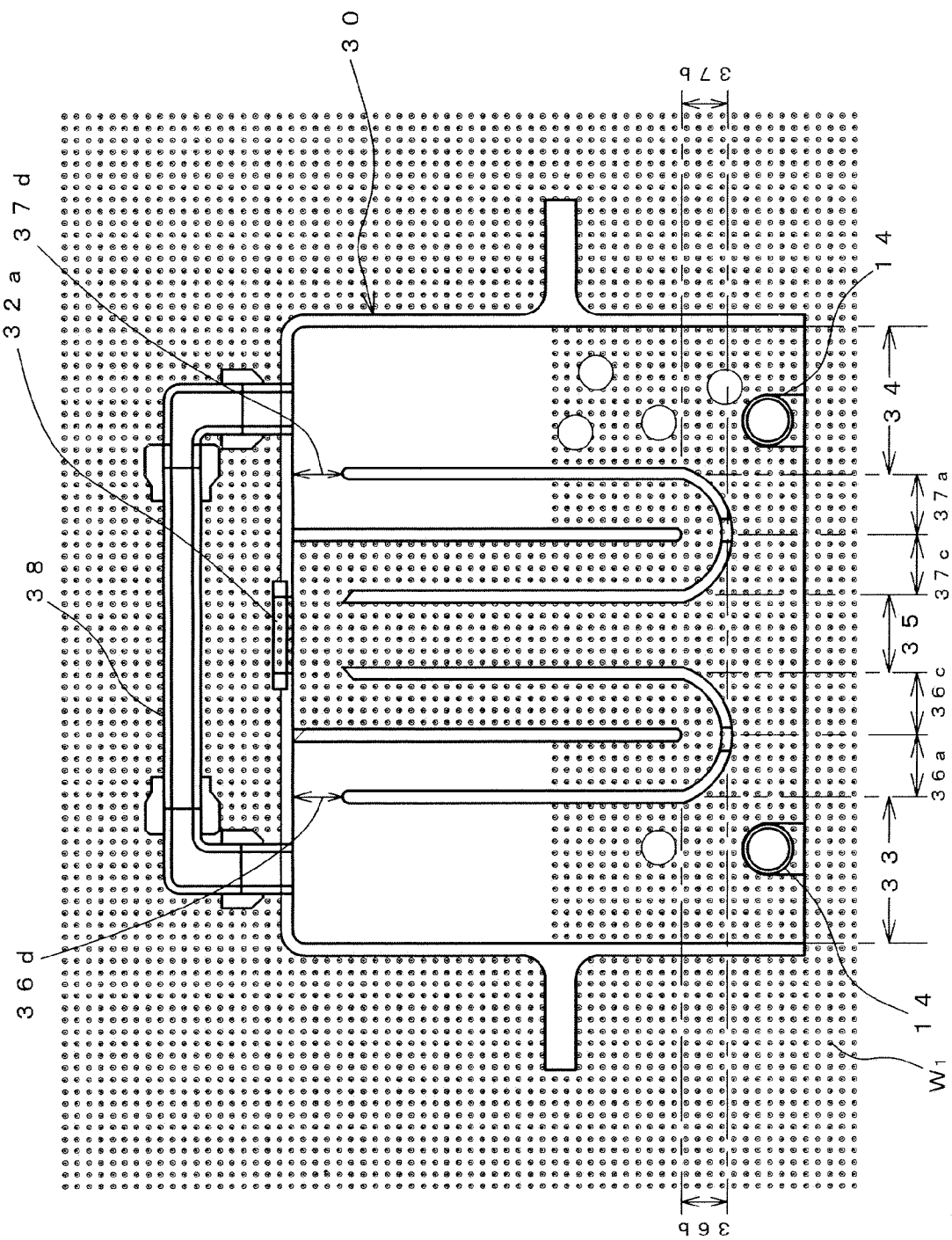
FIG. 14 is a cross-sectional diagram illustrating an example of a state of the bubble generation device in the second phase in batch treatment.

FIG. 14 is a cross-sectional diagram illustrating an example of a state of the bubble generation device 30 in the second phase in batch treatment. In the illustrated example, the supply speed of air to the second gas storage chamber 34 is higher than the supply speed of air to the first gas storage chamber 33. Nevertheless, the water level of the raw water $W_1$ is substantially the same in each of the first gas storage chamber 33, the descending portion 36a of the first folded-back path 36, and the descending portion 37a of the second folded-back path 37.

In the second gas storage chamber 34, the storage amount of air is instantaneously increased as compared with the first gas storage chamber 33 due to a difference in air supply amount, but, due to this increase, the air pressure in the second gas storage chamber 34 is higher than the air pressure in the first gas storage chamber 33. Then, the air in the second gas storage chamber 34 moves to the first gas storage chamber 33 on the low pressure side to eliminate the air pressure difference. As a result, the water level of the raw water $W_1$ is adjusted to the same height in each of the first gas storage chamber 33, the descending portion 36a of the first folded-back path 36, and the descending portion 37a of the second folded-back path 37.

With the bubble generation device 30 having such a configuration, it is possible to avoid cleaning failure of the surface of the filtration membrane (23) due to a difference in air supply speed between the first gas storage chamber 33 and the second gas storage chamber 34.

Note that although the bubble generation device 30 according to the example has a configuration in which the communication pipe 38 can be disassembled by four joints, the communication pipe 38 may have any structure as long as the upper portion of the first gas storage chamber 33 and the upper portion of the second gas storage chamber 34 communicate with each other. In addition, in FIG. 13, the structure of the communication pipe 38 is illustrated in a simplified manner for the sake of convenience.

Next, a modification in which a part of the configuration of the bubble generation device 30 according to the embodiment is changed to another configuration will be described.

Figure 15:
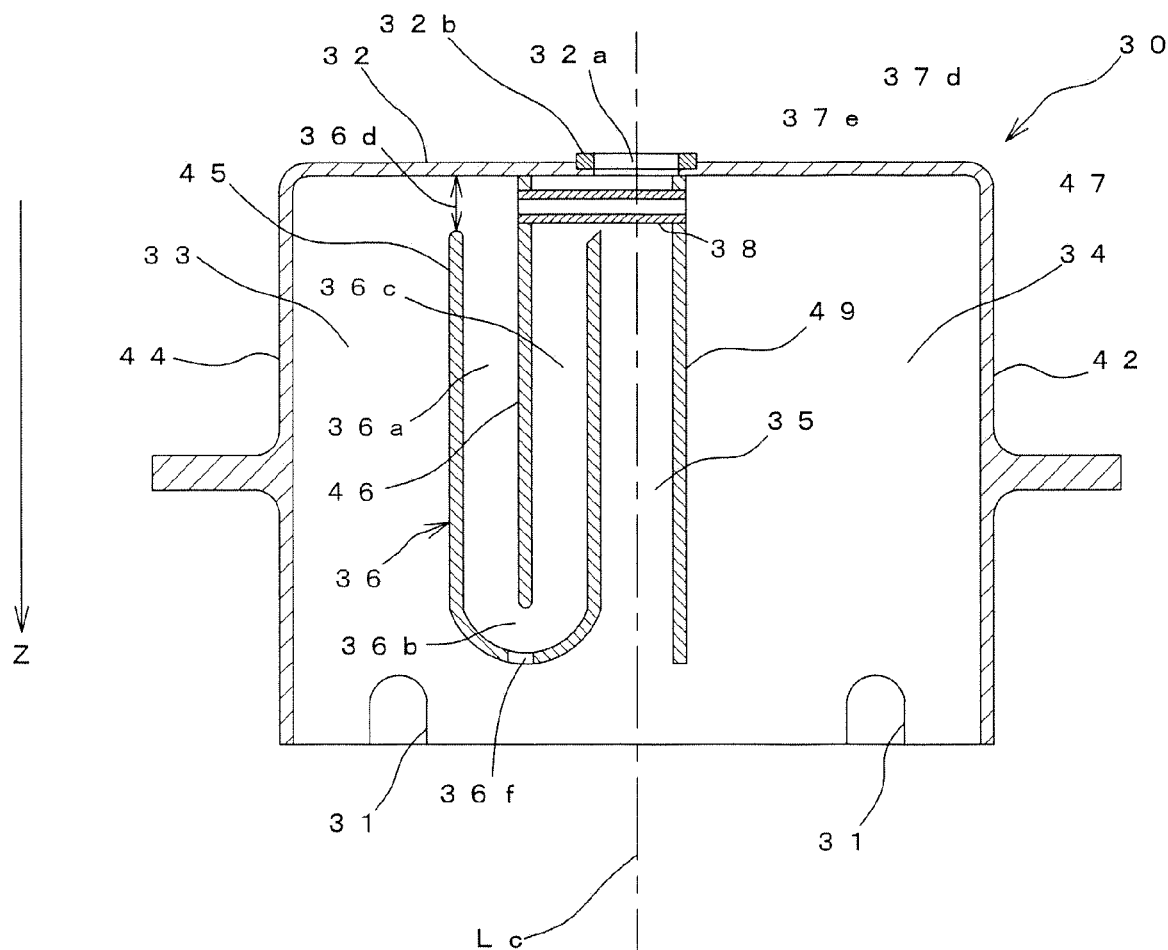
FIG. 15 is a cross-sectional diagram illustrating the bubble generation device according to a modification.

FIG. 15 is a cross-sectional diagram illustrating the bubble generation device 30 according to a modification. The bubble generation device 30 according to the modification does not include the second folded-back path. The bubble release chamber and the second gas storage chamber 34 are partitioned by a partition plate 49 fixed to the first side plate 41, the third side plate 43, and the top plate 32. Each of the first gas storage chamber 33, the first folded-back path 36, the bubble release chamber 35, and the second gas storage chamber 34 is disposed in an aspect of being arranged in an order of the first gas storage chamber 33, the first folded-back path 36, the bubble release chamber 35, and the second gas storage chamber 34 in the lateral direction of the top plate 32. The bubble release chamber 35 and the second gas storage chamber 34 communicate with each other via the communication pipe 38.

Figure 16:
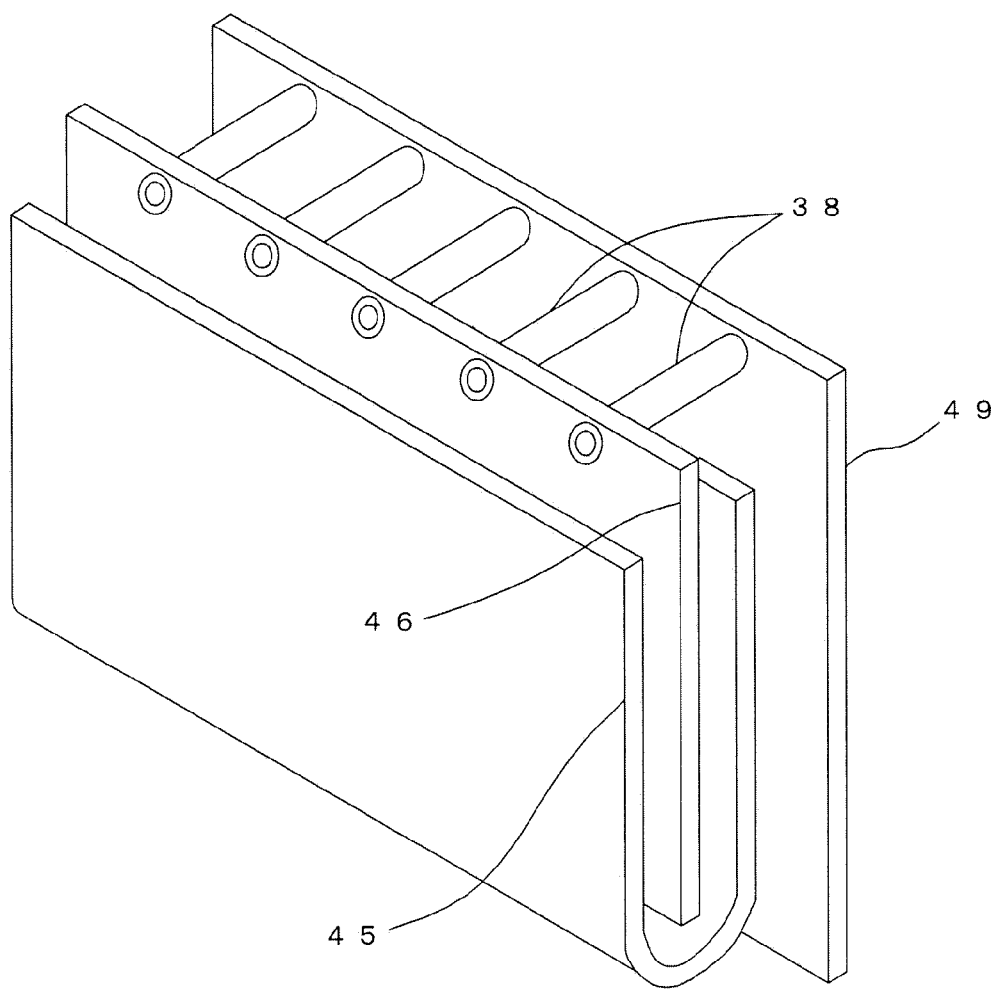
FIG. 16 is a perspective diagram illustrating a folded-back plate and an inner plate of a first folded-back path, and a partition plate.

FIG. 16 is a perspective diagram illustrating the folded-back plate 45 and the inner plate 46 of the first folded-back path 36, and the partition plate 49. A plurality of communication pipes 38 is disposed in an aspect of being arranged along the longitudinal direction of the top plate (32). Each of the plurality of communication pipes 38 penetrates the partition plate 49 and the inner plate 46 to communicate the first gas storage chamber 33 and the second gas storage chamber 34. In addition, each of the plurality of communication pipes 38 is disposed at a position shifted from a position immediately below the bubble release port (32a).

The present inventors have confirmed through experiments that the bubble generation device 30 according to the modification can widen the range of the appropriate air feed amount as compared with the embodiment. The air feed amount is an air supply amount per unit time with respect to the first gas storage chamber 33 and the second gas storage chamber. In addition, the appropriate air feed amount is a range of the air feed amount at which the bubbles can be released at a stable time interval. In the embodiment, the air entering the bubble release chamber 35 from the first folded-back path 36 and the air entering the bubble release chamber 35 from the second folded-back path 37 collide with each other in the bubble release chamber 35. On the other hand, since the bubble generation device 30 according to the modification does not generate the collision as described above, it is considered that the range of the appropriate air feed amount can be widened as compared with the embodiment.

The present invention is not limited to the above-described embodiment, example, and modification, and a configuration different from the embodiment and the example can be adopted within a range where the configuration of the present invention can be applied. The present invention has unique operations and effects for each aspect described below.

[First Aspect]

A first aspect is a bubble generation device (for example, bubble generation device 30) including a gas storage chamber (for example, first gas storage chamber) that stores a liquid therein and stores a gas supplied into the liquid above the liquid, and a folded-back path (for example, first folded-back path 36) that communicates with the gas storage chamber and extends to below, and is then folded back to extend to above, the bubble generation device releasing the gas passing through the folded-back path as bubbles, the bubble generation device including: a housing (for example, housing 40) that includes a plurality of side plates (for example, first side plate 41 to fourth side plate 44) and a top plate (for example, top plate 32) fixed to a plurality of the side plates in an aspect of covering a space surrounded by a plurality of the side plates from above; a plurality of bubble release ports (for example, bubble release ports 32a) that is disposed in the top plate in an aspect of being arranged along a longitudinal direction of the top plate; and a bubble release chamber (for example, bubble release chamber 35) that is disposed in the housing and communicates with a plurality of the bubble release ports, wherein each of the gas storage chamber, the folded-back path, and the bubble release chamber is disposed in the housing in an aspect of being arranged in an order of the gas storage chamber, the folded-back path, and the bubble release chamber along a lateral direction of the top plate, the folded-back path is formed by at least a folded-back plate (for example, folded-back plate 45) having a cross-sectional shape that extends to below and is then folded back to above, and an inner plate (for example, inner plate 46) disposed inside the folded-back plate, one end of each of the folded-back plate and the inner plate in the longitudinal direction is fixed to one (for example, first side plate 41) of the two side plates facing each other along the longitudinal direction among a plurality of the side plates, an other end of each of the folded-back plate and the inner plate in the longitudinal direction is fixed to the other (for example, third side plate 43) of the two side plates, one side of the folded-back path in the lateral direction communicates with the bubble release chamber, and an other side of the folded-back path in the lateral direction communicates with the gas storage chamber.

In such a configuration, the air entering the bubble release chamber from the folded-back path is pressurized toward the top plate with a uniform pressure, so that the bubbles are released almost simultaneously from each of the plurality of bubble release ports communicating with the bubble release chamber. Thus, according to the first aspect, the plurality of bubbles can be caused to hit the filtration membranes almost simultaneously.

[Second Aspect]

A second aspect includes the configuration of the first aspect, wherein the folded-back plate is fixed, in an aspect of forming a gap between an upper end on one side in the lateral direction and the top plate and forming a gap between an upper end on an other side in the lateral direction and the top plate, to the two top plates, the folded-back path and the bubble release chamber communicate with each other through the gap between the upper end on the one side in the lateral direction of the folded-back plate and the top plate, the folded-back path and the gas storage chamber communicate with each other through the gap between the upper end on the other side in the lateral direction of the folded-back plate and the top plate, and the inner plate is fixed to the two side plates and the top plate.

According to the second aspect, the folded-back path can be formed by combining the folded-back plate and the inner plate, the gas storage chamber and the descending portion of the folded-back path can communicate with each other, and the ascending portion of the folded-back path and the bubble release chamber can communicate with each other.

[Third Aspect]

A third aspect includes the configuration of the second aspect and includes, in addition to a first gas storage chamber as the gas storage chamber and a first folded-back path as the folded-back path: a second gas storage chamber (for example, second gas storage chamber 34) and a second folded-back path (for example, second folded-back path 37), wherein each of the first gas storage chamber, the first folded-back path, the bubble release chamber, the second folded-back path, and the second gas storage chamber is disposed in the lateral direction in an aspect of being arranged in an order of the first gas storage chamber, the first folded-back path, the bubble release chamber, the second folded-back path, and the second gas storage chamber, the second folded-back path is formed by at least a folded-back plate (for example, folded-back plate 47) having a cross-sectional shape that extends to below and is then folded back to above, and an inner plate (for example, inner plate 48) disposed inside the folded-back plate, one end of each of the folded-back plate and the inner plate in the longitudinal direction is fixed to one of the two side plates facing each other along the longitudinal direction among a plurality of the side plates, an other end of each of the folded-back plate and the inner plate in the longitudinal direction is fixed to the other of the two side plates, an other side of the second folded-back path in the lateral direction communicates with the bubble release chamber, and one side of the second folded-back path in the lateral direction communicates with the second gas storage chamber.

According to the third aspect, a gas can be supplied from the first folded-back path and the second folded-back path to the bubble release chamber.

[Fourth Aspect]

A fourth aspect includes the configuration of the third aspect, wherein the folded-back plate of the second folded-back path is fixed, in an aspect of forming a gap between an upper end on one side in the lateral direction and the top plate and forming a gap between an upper end on an other side in the lateral direction and the top plate, to the two top plates, the second folded-back path and the bubble release chamber communicate with each other through the gap between the upper end on the other side in the lateral direction of the folded-back plate of the second folded-back path and the top plate, the second folded-back path and the second gas storage chamber communicate with each other through the gap between the upper end on the one side in the lateral direction of the folded-back plate of the second folded-back path and the top plate, and the inner plate of the second folded-back path is fixed to the two side plates and the top plate.

According to the fourth aspect, the second folded-back path can be formed by combining the folded-back plate and the inner plate, the second gas storage chamber and the descending portion of the second folded-back path can communicate with each other, and the ascending portion of the second folded-back path and the bubble release chamber can communicate with each other.

[Fifth Aspect]

A fifth aspect includes the configuration of the third aspect or the fourth aspect, wherein the first gas storage chamber and the second gas storage chamber communicate with each other via a communication pipe (for example, communication pipe 38).

According to the fifth aspect, it is possible to avoid cleaning failure of the surface of the filtration membrane due to a difference in gas supply speed between the first gas storage chamber and the second gas storage chamber.

[Sixth Aspect]

A sixth aspect includes the configuration of the second aspect and includes, in addition to a first gas storage chamber as the gas storage chamber and a first folded-back path as the folded-back path: a second gas storage chamber and a second folded-back path, wherein each of the first gas storage chamber, the first folded-back path, the bubble release chamber, the second folded-back path, and the second gas storage chamber is disposed in the lateral direction in an aspect of being arranged in an order of the first gas storage chamber, the first folded-back path, the bubble release chamber, the second folded-back path, and the second gas storage chamber, the second folded-back path is formed by at least a folded-back plate having a cross-sectional shape that extends to below and is then folded back to above, and an inner plate disposed inside the folded-back plate, one end of each of the folded-back plate and the inner plate in the longitudinal direction is fixed to one of the two side plates facing each other along the longitudinal direction among a plurality of the side plates, an other end of each of the folded-back plate and the inner plate in the longitudinal direction is fixed to the other of the two side plates, an other side of the second folded-back path in the lateral direction communicates with the bubble release chamber, and one side of the second folded-back path in the lateral direction communicates with the second gas storage chamber.

According to the sixth aspect, the range of the appropriate air feed amount can be widened as compared with the fifth aspect.

[Seventh Aspect]

A seventh aspect is a liquid filtration device (for example, liquid filtration device 50) including: a filtration membrane (for example, filtration membrane 23) that includes a membrane portion (for example, a portion of the filtration membrane 23 other than hollows) and a hollow (for example, hollows 23a) surrounded by the membrane portion, and receives a suction force in the hollow in a state of being disposed in a liquid to take an external liquid into the hollow through the membrane portion and filtrate the liquid; and a bubble generation device that is disposed below the filtration membrane and releases bubbles toward the filtration membrane, wherein the bubble generation device is the bubble generation device according to any of the first to sixth aspects.

With such a configuration, the filtration membrane can be satisfactorily scrubbed by bubbles having a large diameter released from the bubble generation device.

The present application claims priority based on Japanese Patent Application No. 2022-31598 filed on Mar. 2, 2022, the entire contents of which are incorporated herein by reference.

REFERENCE SIGNS LIST

20 Membrane module
21 Housing
22 Membrane element
23 Filtration membrane
23a Hollow
30 Bubble generation device
32 Top plate
32a Bubble release port
33 First gas storage chamber
34 Second gas storage chamber
35 Bubble release chamber
36 First folded-back path
36a Descending portion
36b Folded-back portion
36c Ascending portion
36d First communication port
36e Second communication port
36f Opening
37 Second folded-back path
37a Descending portion
37b Folded-back portion
37c Ascending portion
37d First communication port
37e Second communication port
37f Opening
38 Communication pipe
39 Lower end opening
$W_1$ Raw water (liquid)

The invention claimed is:

1. A bubble generation device comprising:
a housing comprising a plurality of side plates and a top plate fixed to a plurality of the side plates in an aspect of covering a space surrounded by a plurality of the side plates from above, the top plate defining a plurality of bubble release ports arranged along a longitudinal direction of the top plate the housing defining:
a gas storage chamber configured to store a liquid therein in a lower portion of the gas storage chamber, the gas storage chamber configured to store a gas supplied into the liquid above the liquid in an upper portion of the gas storage chamber between the lower portion and the top plate; and
a bubble release chamber communicating with the plurality of the bubble release ports;
a folded-back plate having a cross-sectional shape that extends to the lower portion and is then folded back to the upper portion;
an inner plate disposed inside of the folded-back plate, the folded-back plate and the inner plate together forming a folded-back path that communicates with the gas storage chamber and extends to the lower portion, and is folded back to extend to the upper portion,
wherein:
each of the gas storage chamber, the folded-back path, and the bubble release chamber is disposed in the housing in an order away from one side plate of the plurality of side plates of (i) the gas storage chamber, (ii) the folded-back path, and (iii) the bubble release chamber along a lateral direction of the top plate that is perpendicular to the longitudinal direction,
one end of each of the folded-back plate and the inner plate in the longitudinal direction is fixed to one of the two side plates facing each other along the longitudinal direction among a plurality of the side plates,
an other end of each of the folded-back plate and the inner plate in the longitudinal direction is fixed to the other of the two side plates,
one side of the folded-back path in the lateral direction communicates with the bubble release chamber,
an other side of the folded-back path in the lateral direction communicates with the gas storage chamber, and
the bubble generation device is configured to release the gas passing through the folded-back path as bubbles.

2. The bubble generation device according to claim 1, wherein:
the folded-back plate is fixed to the two side plates such that a first upper end of the folded-back plate at a first lateral side of the folded-back plate forms a first gap between the first upper end and the top plate, and a second upper end of the folded-back plate at a second lateral side of the folded-back plate forms a second gap between the second upper end and the top plate
the folded-back path and the bubble release chamber communicate with each other through the second gap,
the folded-back path and the gas storage chamber communicate with each other through the first gap, and
the inner plate is fixed to the two side plates and the top plate.

3. The bubble generation device according to claim 2, wherein the gas storage chamber is a first gas storage chamber, wherein the folded-back path is a first folded-back path, wherein the bubble generation device further comprises: a second gas storage chamber and a second folded-back path,
wherein:
each of the first gas storage chamber, the first folded-back path, the bubble release chamber, the second folded-back path, and the second gas storage chamber is disposed in the housing in the order away from the one side plate of (i) the first gas storage chamber, (ii) the first folded-back path, (iii) the bubble release chamber, (iv) the second folded-back path, and (v) the second gas storage chamber,
the second folded-back path is formed by at least a second folded-back plate having a cross-sectional shape that extends to the lower portion and is then folded back to the upper portion, and a second inner plate disposed inside the second folded-back plate,
one end of each of the second folded-back plate and the second inner plate in the longitudinal direction is fixed to one of the two side plates facing each other along the longitudinal direction among a plurality of the side plates,
an other end of each of the second folded-back plate and the second inner plate in the longitudinal direction is fixed to the other of the two side plates,
an other side of the second folded-back path in the lateral direction communicates with the bubble release chamber, and one side of the second folded-back path in the lateral direction communicates with the second gas storage chamber.

4. The bubble generation device according to claim 3, wherein:
the second folded-back plate of the second folded-back path is fixed to the two side plates such that a first upper end of the second folded-back plate at a first lateral side of the second folded-back plate forms a third gap between the first upper end of the second folded-back plate and the top plate, and a second upper end of the second folded-back plate at a second lateral side of the second folded-back plate forms a fourth gap between the second upper end of the second folded-back plate and the top plate,
the second folded-back path and the bubble release chamber communicate with each other through the fourth gap,
the second folded-back path and the second gas storage chamber communicate with each other through the third gap, and
the second inner plate of the second folded-back path is fixed to the two side plates and the top plate.

5. The bubble generation device according to claim 4, wherein the first gas storage chamber and the second gas storage chamber communicate with each other via a communication pipe.

6. A liquid filtration device comprising:
a filtration membrane that includes a membrane portion and a hollow surrounded by the membrane portion, the membrane portion configured to filter an external liquid that is pulled through the membrane portion and into the hollow responsive to a suction force; and
the bubble generation device according to claim 5, the bubble generation device disposed below the filtration membrane and configured to release bubbles toward the filtration membrane.

7. A liquid filtration device comprising:
a filtration membrane that includes a membrane portion and a hollow surrounded by the membrane portion, the membrane portion configured to filter an external liquid that is pulled through the membrane portion and into the hollow responsive to a suction force; and
the bubble generation device according to claim 4, the bubble generation device disposed below the filtration membrane and configured to release bubbles toward the filtration membrane.

8. The bubble generation device according to claim 3, wherein the first gas storage chamber and the second gas storage chamber communicate with each other via a communication pipe.

9. A liquid filtration device comprising:
a filtration membrane that includes a membrane portion and a hollow surrounded by the membrane portion, the membrane portion configured to filter an external liquid that is pulled through the membrane portion and into the hollow responsive to a suction force; and
the bubble generation device according to claim 8, the bubble generation device disposed below the filtration membrane and configured to release bubbles toward the filtration membrane.

10. A liquid filtration device comprising:
a filtration membrane that includes a membrane portion and a hollow surrounded by the membrane portion, the membrane portion configured to filter an external liquid that is pulled through the membrane portion and into the hollow responsive to a suction force; and
the bubble generation device according to claim 3, the bubble generation device disposed below the filtration membrane and configured to release bubbles toward the filtration membrane.

11. The bubble generation device according to claim 2, wherein the gas storage chamber is a first gas storage chamber, wherein the bubble generation device further comprises: a second gas storage chamber,
wherein:
each of the first gas storage chamber, the folded-back path, the bubble release chamber, and the second gas storage chamber is disposed in the housing in the order away from the one side plate of (i) the first gas storage chamber, (ii) the folded-back path, (iii) the bubble release chamber, and (iv the second gas storage chamber in the lateral direction,
the bubble release chamber and the second gas storage chamber are partitioned by a partition plate fixed to the two side plates and the top plate, and
the first gas storage chamber and the second gas storage chamber communicate with each other via a communication pipe.

12. A liquid filtration device comprising:
a filtration membrane that includes a membrane portion and a hollow surrounded by the membrane portion, the membrane portion configured to filter an external liquid that is pulled through the membrane portion and into the hollow responsive to a suction force; and
the bubble generation device according to claim 11, the bubble generation device disposed below the filtration membrane and configured to release bubbles toward the filtration membrane.

13. A liquid filtration device comprising:
a filtration membrane that includes a membrane portion and a hollow surrounded by the membrane portion, the membrane portion configured to filter an external liquid that is pulled through the membrane portion and into the hollow responsive to a suction force; and
the bubble generation device according to claim 2, the bubble generation device disposed below the filtration membrane and configured to release bubbles toward the filtration membrane.

14. A liquid filtration device comprising:
a filtration membrane that includes a membrane portion and a hollow surrounded by the membrane portion, the membrane portion configured to filter an external liquid that is pulled through the membrane portion and into the hollow responsive to a suction force; and
the bubble generation device according to claim 1, the bubble generation device disposed below the filtration membrane and configured to release bubbles toward the filtration membrane.

* * * * *